(12) United States Patent
Anjo et al.

(10) Patent No.: US 10,509,544 B2
(45) Date of Patent: Dec. 17, 2019

(54) SCHEDULE MANAGEMENT APPARATUS

(71) Applicant: CASIO COMPUTER CO., LTD., Shibuya-ku, Tokyo (JP)

(72) Inventors: Keita Anjo, Tokyo (JP); Takehiko Mizoguchi, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 123 days.

(21) Appl. No.: 15/469,719

(22) Filed: Mar. 27, 2017

(65) Prior Publication Data

US 2017/0371503 A1 Dec. 28, 2017

(30) Foreign Application Priority Data

Jun. 22, 2016 (JP) ................................ 2016-123391
Jun. 22, 2016 (JP) ................................ 2016-123394

(51) Int. Cl.
| | |
|---|---|
| *G06F 3/048* | (2013.01) |
| *G06F 3/0482* | (2013.01) |
| *G06F 3/0484* | (2013.01) |
| *G06F 3/0485* | (2013.01) |
| *G06F 3/0488* | (2013.01) |
| *G06Q 10/10* | (2012.01) |

(52) U.S. Cl.
CPC .......... *G06F 3/0482* (2013.01); *G06F 3/0485* (2013.01); *G06F 3/0488* (2013.01); *G06F 3/04845* (2013.01); *G06Q 10/1097* (2013.01); *G06F 2203/04803* (2013.01)

(58) Field of Classification Search
CPC .............................. G06F 3/0482; G06F 3/0485
See application file for complete search history.

(56) References Cited

U.S. PATENT DOCUMENTS 5,860,067 A    1/1999    Onda et al.
5,877,760 A    3/1999    Onda et al.
(Continued)

FOREIGN PATENT DOCUMENTS

JP    01288894 A    11/1989
JP    06342357 A    12/1994
(Continued)

OTHER PUBLICATIONS

Japanese Office Action (and English language translation thereof) dated Jun. 12, 2018 issued in counterpart Japanese Application No. 2016-123394.

(Continued)

*Primary Examiner* — Haoshian Shih
(74) *Attorney, Agent, or Firm* — Holtz, Holtz & Volek PC

(57) ABSTRACT

A display control apparatus includes the following. A first display controller controls a display to display a schedule in which predetermined date information or time span information is corresponded with each of a plurality of schedule frames in a schedule template in which the plurality of schedule frames are provided in a predetermined format. A second display controller controls the display to display a predetermined operation button so that the first display controller displays a plurality of schedules in an aligned state. When the first display controller displays the plurality of schedules in the aligned state according to operation of the predetermined operation button, a portion of each schedule is displayed.

14 Claims, 17 Drawing Sheets

(56) References Cited

U.S. PATENT DOCUMENTS

| | | |
|---|---|---|
| 5,943,051 A | 8/1999 | Onda et al. |
| 9,026,178 B2 | 5/2015 | Nii |
| 2003/0189584 A1* | 10/2003 | Watanabe ........... G06F 15/0266 |
| | | 715/700 |
| 2008/0075268 A1* | 3/2008 | Medina ............... H04M 3/5175 |
| | | 379/265.06 |
| 2011/0159928 A1 | 6/2011 | Nii |
| 2014/0298206 A1* | 10/2014 | Kurosawa ............. G06Q 10/10 |
| | | 715/753 |
| 2016/0082504 A1* | 3/2016 | Okochi ................. B22D 17/32 |
| | | 164/150.1 |
| 2016/0217407 A1* | 7/2016 | Ostanik ........... G06Q 10/06393 |

FOREIGN PATENT DOCUMENTS

| | | |
|---|---|---|
| JP | 09128441 A | 5/1997 |
| JP | 09134270 A | 5/1997 |
| JP | 2007065909 A | 3/2007 |
| JP | 2007183857 A | 7/2007 |
| JP | 2011135346 A | 7/2011 |
| JP | 2012103868 A | 5/2012 |
| JP | 2014209340 A | 11/2014 |

OTHER PUBLICATIONS

Japanese Office Action (and English language translation thereof) dated Jun. 19, 2018 issued in counterpart Japanese Application No. 2016-123391.

Shin-Yu "Tutorial Course to Edit YouTube movies", Sotechsha, Junichi Yanagisawa, Feb. 29, 2016, First Edition.

Japanese Office Action (and English language translation thereof) dated Oct. 30, 2018 issued in counterpart Japanese Application No. 2016-123391.

Japanese Office Action (and English language translation thereof) dated Oct. 30, 2018 issued in counterpart Japanese Application No. 2016-123394.

* cited by examiner

FIG.4

| STAMP NUMBER | DISPLAY | STAMP IMAGE | TASK CONTENT | MESSAGE IN TO DO LIST | DISPLAY COLOR |
|---|---|---|---|---|---|
| 1 | 発 | 発 | ORDER INSTRUCTION | THERE IS A REQUEST FOR PLACING AN ORDER FROM XX | BLACK |
| 2 | 掃 | 掃 | CLEANING INSTRUCTION | THERE IS A REQUEST FOR CLEANING FROM XX | BLACK |
| 3 | 予 | 予 | RESERVATION SHARE | XX REGISTERED SCHEDULE OF RESERVATIONS | BLACK |
| 4 | ミ | ミ | MEETING INSTRUCTION | XX REGISTERED SCHEDULE OF MEETINGS | BLACK |
| 5 | 忘 | 忘 | ARTICLE LEFT BY CUSTOMER | REGISTERED INFORMATION REGARDING AN ARTICLE LEFT BY THE CUSTOMER | BLACK |
| 6 | 棚 | 棚 | INVENTORY INSTRUCTION | XX REGISTERED REQUEST FOR INVENTORY | BLACK |
| 7 | イ | イ | EVENT SHARE | XX REGISTERED INFORMATION OF EVENT | BLACK |
| 8 | 休 | 休 | TEMPORARY CLOSING OR STORE MANAGER ABSENT | XX REGISTERED SCHEDULE OF DAY OFF | BLACK |
| 9 | 買 | 買 | CONSUMABLES SHOPPING DAY | XX REGISTERED SCHEDULE FOR SHOPPING | BLACK |
| 10 | 学 | 学 | EVENT IN NEARBY SCHOOL | XX REGISTERED A SCHOOL EVENT | BLACK |
| 11 | 社 | 社 | GUEST OF PRESIDENT OR OWNER | XX REGISTERED AN IMPORTANT SCHEDULE | BLACK |
| 12 | 期 | 期 | FIRST SALES DAY OF LIMITED TIME MENU | XX REGISTERED SCHEDULE REGARDING LIMITED TIME MENU | BLACK |
| 13 | 伝 | 伝 | MESSAGE REGISTERED | XX REGISTERED MESSAGE MEMO | BLACK |
| : | : | : | : | : | : |

FIG.5

| WORKER NUMBER | NAME | POSITION | ROLE | PASSWORD |
|---|---|---|---|---|
| 1234 | TARO TANAKA | OWNER | MANAGEMENT | AATANAKA |
| 1235 | JIRO YAMADA | STORE MANAGER | ALL OPERATION | BBYAMADA |
| 1236 | SABURO SUZUKI | PART-TIMER | HALL | CCSUZUKI |
| 1237 | SHIRO KATO | PART-TIMER | KITCHEN | DDKATOH |
| : | : | : | : | : |

FIG.6

| | | | 2015/1/12 | 2015/1/13 | 2015/1/14 | 2015/1/15 | 2015/1/16 | 2015/1/17 | 2015/1/18 | ... |
|---|---|---|---|---|---|---|---|---|---|---|
| 51 | DATE | ... | MONDAY | TUESDAY | WEDNESDAY | THURSDAY | FRIDAY | SATURDAY | SUNDAY | ... |
| 52 | DAY | ... | ¥110,000 | ¥300,000 | ¥240,000 | N/A | N/A | N/A | N/A | ... |
| 53A | SALES | ... | CLOUDY | CLEAR THEN RAIN | RAIN | N/A | N/A | N/A | N/A | ... |
| 53B | WEATHER | ... | 2 PEOPLE | 3 PEOPLE | 3 PEOPLE | 3 PEOPLE | 2 PEOPLE | 3 PEOPLE | 3 PEOPLE | ... |
| 53C | SHIFT | ... | 2 PARTIES | 0 PARTY | 2 PARTIES | 1 PARTY | 0 PARTY | 2 PARTIES | 1 PARTY | ... |
| 53D | RESERVATION | ... | 33 | 100 | 70 | N/A | N/A | N/A | N/A | ... |
| 53E | NUMBER OF CUSTOMERS | ... | NO | NO | NO | NO | YES | NO | NO | ... |
| 53F | MESSAGE MEMO | ... | NO | NO | NO | NO | NO | NO | CULTURAL FESTIVAL | ... |
| 53G | EVENT | ... | ¥3,333 | ¥3,000 | ¥3,429 | N/A | N/A | N/A | N/A | ... |
| 53H | AVERAGE SALES PER CUSTOMER | ... | ¥3,950 | 0 | 0 | N/A | N/A | N/A | N/A | ... |
| 53I | EXPENSES | ... | ... | ... | ... | ... | ... | ... | ... | |
| | ... | | | | | | | | | |

(ATTRIBUTE 53; table reference 50)

FIG. 7

| | | | | | | |
|---|---|---|---|---|---|---|
| 61 — RESERVATION NO. | 1234 | 1235 | 1236 | 1237 | 1238 | ... |
| 62 — DATE | 2015/1/12 | 2015/1/12 | 2015/1/14 | 2015/1/14 | 2015/1/15 | ... |
| 63 — DAY | MONDAY | MONDAY | WEDNESDAY | WEDNESDAY | THURSDAY | ... |
| 64 — TIME | 18:00 | 20:00 | 20:00 | 18:00 | 18:00 | ... |
| 65 — REPRESENTATIVE NAME | SATO | GOTO | ITO | SUZUKI | YOSHIDA | ... |
| 66 — NUMBER OF PEOPLE | 3 PEOPLE | 4 PEOPLE | 5 PEOPLE | 8 PEOPLE | 5 PEOPLE | ... |
| 67 — PHONE NUMBER | 03-1234-5678 | 042-123-4567 | 043-123-4567 | 011-123-4564 | 090-1234-5678 | ... |
| 68 — OTHERS | SEAT ONLY | COURSE A | SEAT ONLY | SEAT ONLY | COURSE B | ... |
| 69 — RESERVATION REGISTRATION SUBMITTER | SHIMADA | SHIMADA | TANAKA | TANAKA | TANAKA | ... |

FIG. 8

| | | | | | | | |
|---|---|---|---|---|---|---|---|
| 71 — DATE | ... | 2015/1/12 | 2015/1/13 | 2015/1/14 | 2015/1/15 | 2015/1/16 | ... |
| 72 — DAY | ... | MONDAY | TUESDAY | WEDNESDAY | THURSDAY | FRIDAY | ... |
| 73 — NUMBER OF WORKERS | ... | 2 PEOPLE | 3 PEOPLE | 3 PEOPLE | 3 PEOPLE | 2 PEOPLE | ... |
| 74 — WORKER NAME | ... | SHIMADA | SHIMADA | TANAKA | TANAKA | SHIMADA | ... |
| | ... | TANAKA | TANAKA | SHIMADA | SHIMADA | KAWAGUCHI | ... |
| | ... | N/A | KAWAGUCHI | KAWAGUCHI | KAWAGUCHI | N/A | ... |

FIG. 9

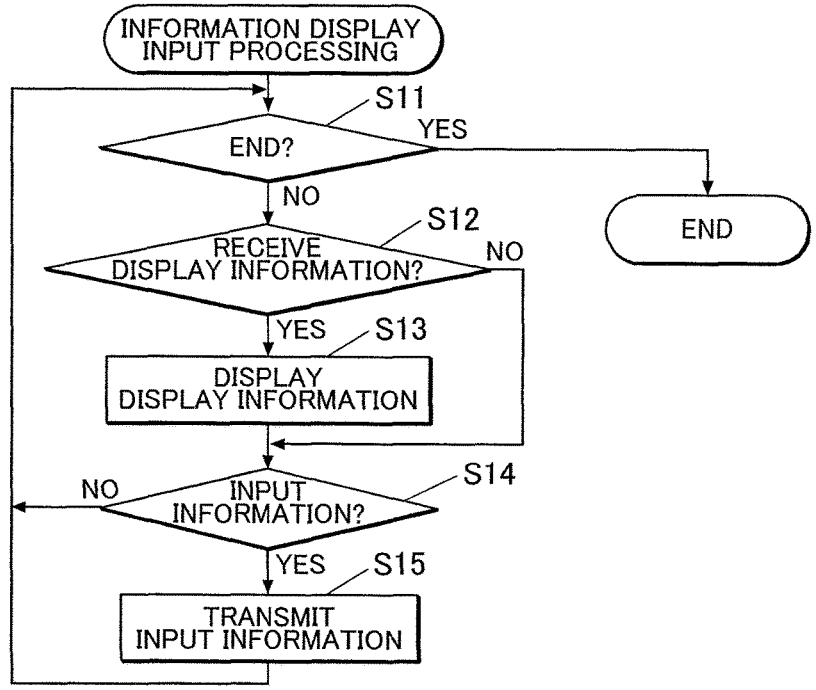

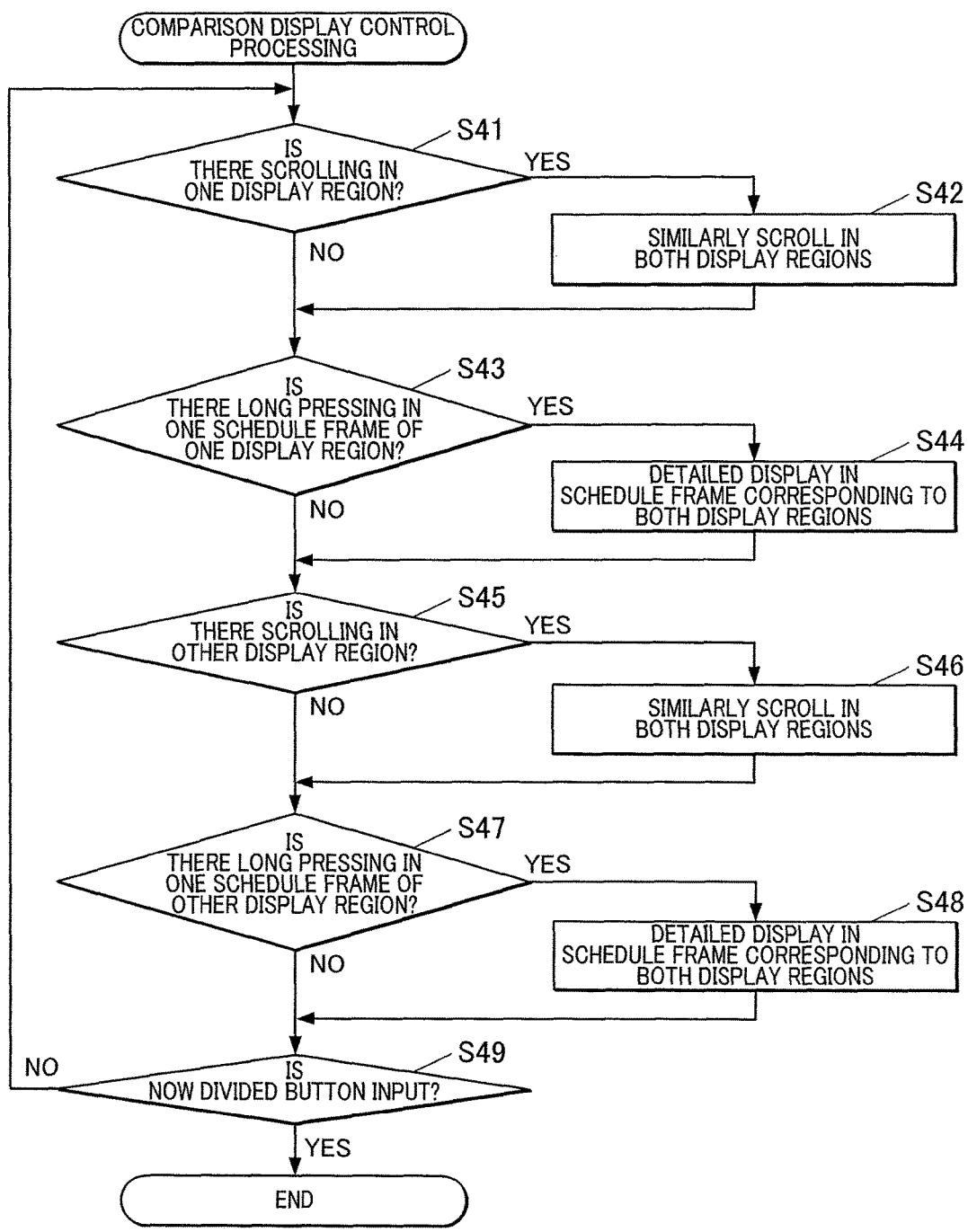

FIG.15A

```
SHIFT        △

SALES
WEATHER
SHIFT
RESERVATION
NUMBER OF
CUSTOMERS
MESSAGE
MEMO
EVENT
AVERAGE SALES
PER CUSTOMER
EXPENSES
```

FIG.15B

```
PRESENT △

PREVIOUS
FISCAL YEAR
PREVIOUS
MONTH
PREVIOUS
WEEK
PRESENT
NEXT WEEK
NEXT MONTH
NEXT FISCAL
YEAR
```

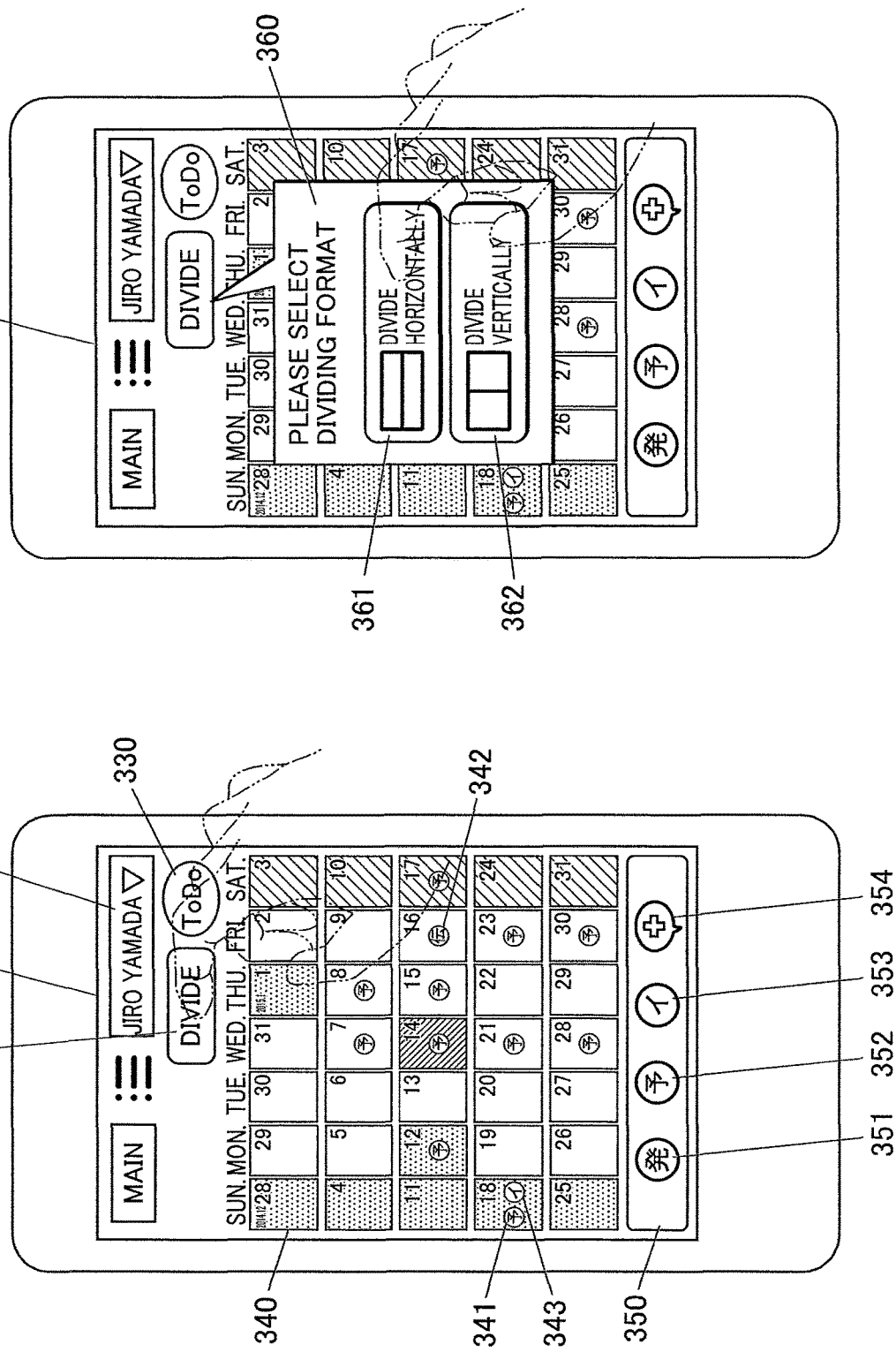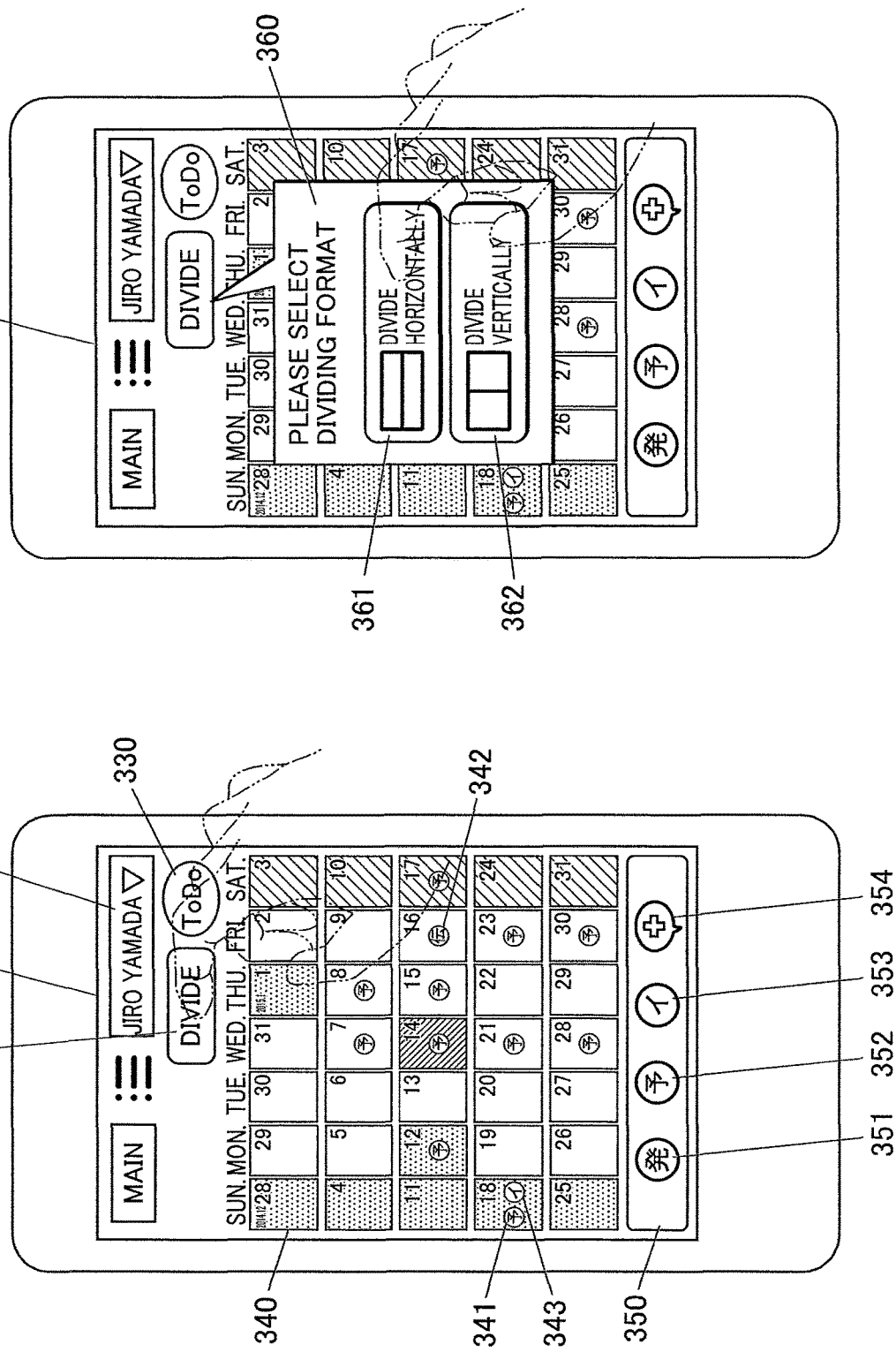

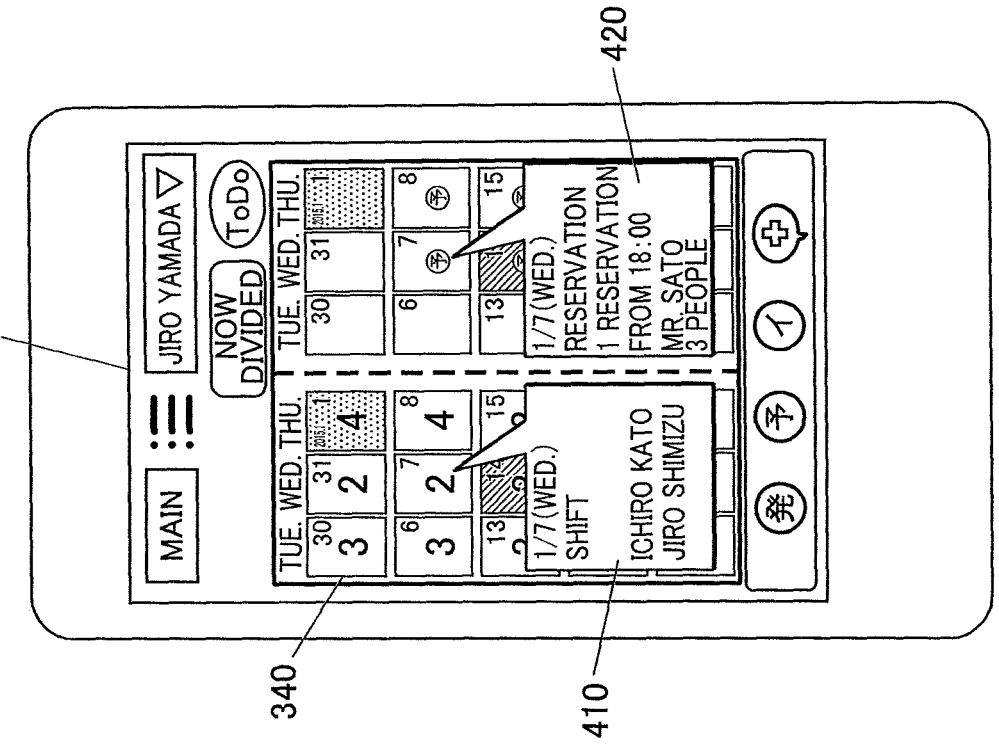
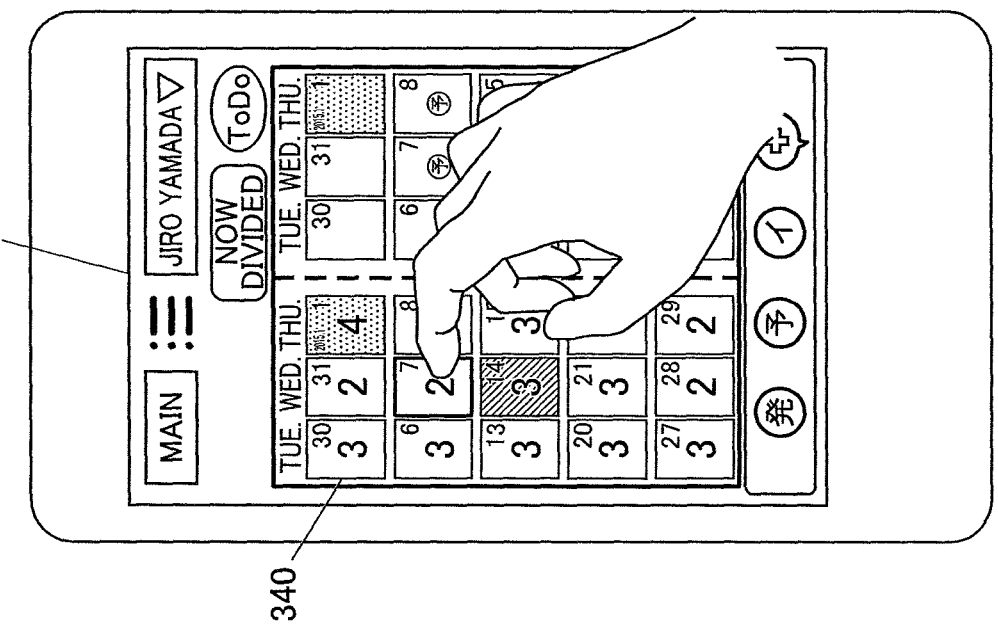

FIG.20A

|  | SUN. | MON. | TUE. | WED. | THU. | FRI. | SAT. |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

FIG.20B

|  | SUN. | MON. | TUE. | WED. | THU. | FRI. | SAT. |
|---|---|---|---|---|---|---|---|
| 11:00 ~ 17:00 |  |  |  |  |  |  |  |
| 17:00 ~ 20:00 |  |  |  |  |  |  |  |
| 20:00 ~ 23:00 |  |  |  |  |  |  |  |

SCHEDULE MANAGEMENT APPARATUS

CROSS-REFERENCE TO RELATED APPLICATIONS

This application is based upon and claims the benefit of priority from the prior Japanese Patent Application No. 2016-123391, filed on Jun. 22, 2016, and the prior Japanese Patent Application No. 2016-123394, filed on Jun. 22, 2016 the entire contents of which are incorporated herein by reference.

BACKGROUND OF THE INVENTION

1. Field of the Invention

The present invention relates to a display control apparatus.

2. Description of the Related Art

Conventionally, there is a known schedule management apparatus which manages a schedule. For example, there is a known information processing apparatus which displays a weather forecast in a region of a corresponding date of a calendar in which a schedule is managed to be useful in making plans for the day (Japanese Patent Application Laid-Open Publication No. H9-128441).

SUMMARY OF THE INVENTION

However, for example, in such information processing apparatus, when the calendar showing the month is used as the schedule, the region for each date becomes small. If the plans for the day and the weather forecast are displayed in such region of the date, it becomes difficult to view the calendar. This becomes a problem especially when the information processing apparatus is a portable terminal apparatus such as a smartphone. When the calendar displaying the plans and the calendar displaying the weather forecast are displayed separately by switching the display screens, although the problem of difficulty in viewing the calendar is solved, it becomes difficult to compare the plans and the weather forecast displayed in the calendar.

The present invention is made in view of the above problems, and the purpose of the present invention is to easily understand a plurality of pieces of data with different viewpoints at the same time when the data is managed corresponded with a calendar.

According to an aspect of the present invention, there is provided a display control apparatus including: a first display controller which controls a display to display a schedule in which predetermined date information or time span information is corresponded with each of a plurality of schedule frames in a schedule template in which the plurality of schedule frames are provided in a predetermined format; and a second display controller which controls the display to display a predetermined operation button so that the first display controller displays a plurality of schedules in an aligned state, wherein, when the first display controller displays the plurality of schedules in the aligned state according to operation of the predetermined operation button, a portion of each schedule is displayed.

According to another aspect of the present invention, there is provided a display control apparatus including: a schedule display controller which displays schedule information in a first display region and a second display region; and a display mode controller which changes a display mode in both the schedule information displayed in the first display region and the schedule information displayed in the second display region to the display mode according to predetermined operation when the predetermined operation is performed on either one of the schedule information displayed in the first display region or the schedule information displayed in the second display region.

According to another aspect of the present invention, there is provided a display control apparatus including: a schedule display controller which displays schedule information in a first display region and a second display region as a calendar display or divided into time span frames, and which displays the schedule information so that a range of a displayed schedule term is to be equal between the first display region and the second display region; and a detecting unit which detects touching on the first display region or touching on the second display region, wherein, the schedule display controller displays the schedule information with the range of both schedule terms changed regardless of whether the touching is the touching on the first display region or the touching on the second display region when the touching detected by the detecting unit is a predetermined operation to change the range of the schedule term.

According to the present invention, it is possible to easily understand a plurality of pieces of data with different viewpoints at the same time when the data is managed corresponded with a calendar.

BRIEF DESCRIPTION OF THE DRAWINGS

FIG. 4 is a diagram showing a configuration of a stamp data table.

FIG. 5 is a diagram showing a configuration of an account data table.

FIG. 6 is a diagram showing a configuration of a calendar data table.

FIG. 7 is a diagram showing a configuration of a reservation data table.

FIG. 8 is a diagram showing a configuration of a shift data table.

FIG. 9 is a flowchart showing information display input processing.

FIG. 12 is a flowchart showing comparison display control processing.

FIG. 15A is a diagram showing an example of a list of selection items displayed in a first attribute selection form or a second attribute selection form.

FIG. 15B is a diagram showing an example of a list of selection items displayed in a first period selection form or a second period selection form.

FIG. 16A and FIG. 16B are diagrams showing an example of a display screen of a terminal apparatus which performs the divided display control processing.

FIG. 19A and FIG. 19B are diagrams showing an example of a display screen of a terminal apparatus which performs the comparison display control processing.

FIG. 20A and FIG. 20B are diagrams showing an example of a schedule template.

FIG. 21A and FIG. 21B are diagrams showing an example of a display screen of a terminal apparatus which performs the divided display control processing.

DETAILED DESCRIPTION OF THE PREFERRED EMBODIMENTS

An embodiment of the present invention is described in detail with reference to the drawings. The scope of the present invention is not limited to the illustrated examples.

Figure 1:
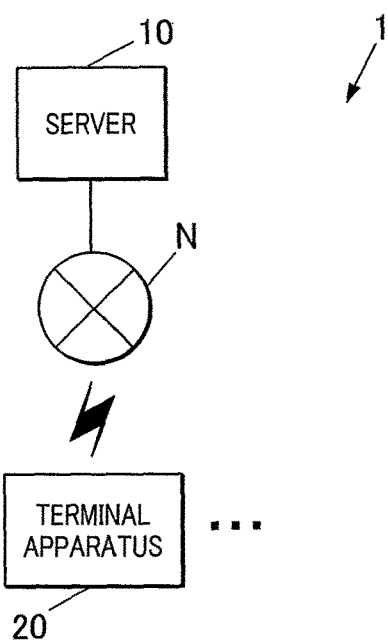
FIG. 1 is a block diagram showing a store data management system according to an embodiment of the present invention.

The apparatus configuration of the present embodiment is described with reference to FIG. 1 to FIG. 3. The store data management system 1 of the present embodiment is described with reference to FIG. 1. FIG. 1 is a block diagram showing a store data management system 1 according to the present embodiment.

The store data management system 1 includes a server 10 and a plurality of terminal apparatuses 20. According to the present embodiment, as one example, the store data management system 1 is a system used commonly by a plurality of workers (owner, store manager, part-time workers, etc.) who work in an independently operated restaurant. The present invention is not limited to the above.

The server 10 is a server connected to a communication network N and manages store data regarding the work handled by the user of the terminal apparatus 20. The communication network N is to be the internet, but can be other networks such as LAN (Local Area Network), etc.

The terminal apparatus 20 is a portable terminal apparatus which is held by each user as the employee of the restaurant. Here, the terminal apparatus 20 is described as a smartphone, but the present invention is not limited to the above. The terminal apparatus 20 may be other portable terminal apparatuses such as a tablet PC (Personal Computer), cellular phone, PDA (Personal Digital Assistant), laptop PC, etc. or a terminal apparatus such as a desktop PC. The terminal apparatus 20 receives the input of operation, etc. from the user to transmit the input to the server 10, and displays the information received from the server 10. The terminal apparatus 20 is connected to the communication network N through base stations, access points, etc. on the communication network N, (all not shown).

The store data management system 1 is a system in which the server 10 manages the store data regarding the work handled by each user of the plurality of the terminal apparatuses 20, but the present invention is not limited to the above. Alternatively, the store data management system 1 can include one terminal apparatus 20 held by one individual user or one terminal apparatus 20 can be commonly used by a plurality of users.

The internal functional configuration of the server 10 is described with reference to FIG. 2. FIG. 2 is a block diagram showing a functional configuration of the server 10.

Figure 2:
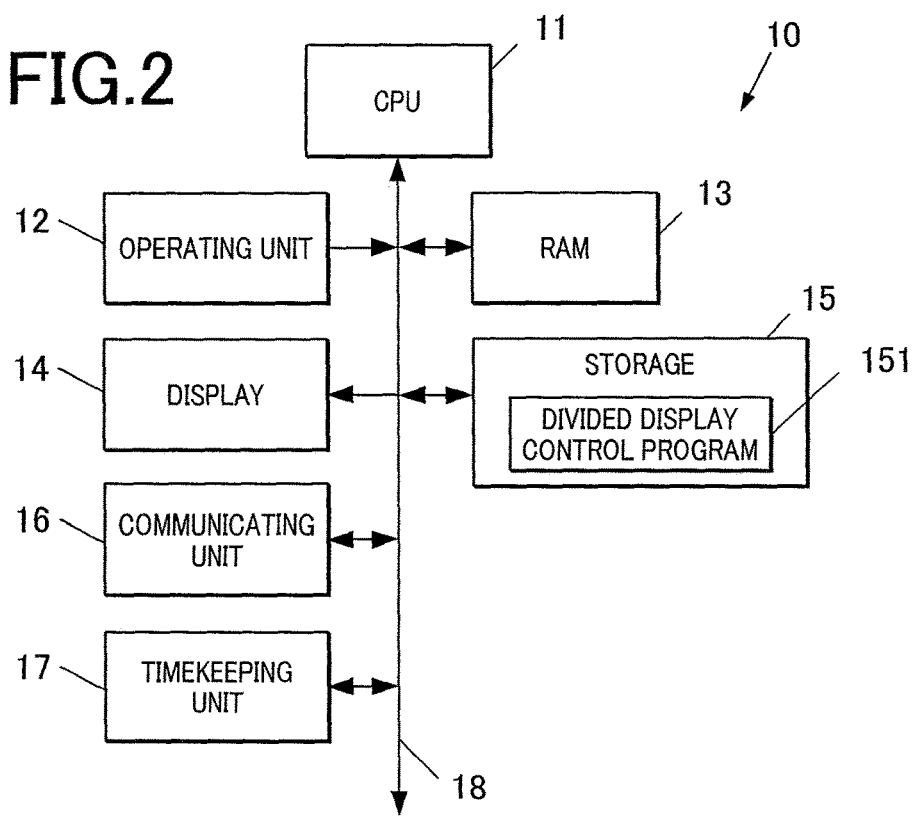
FIG. 2 is a block diagram showing a functional configuration of a server.
Figure 3:
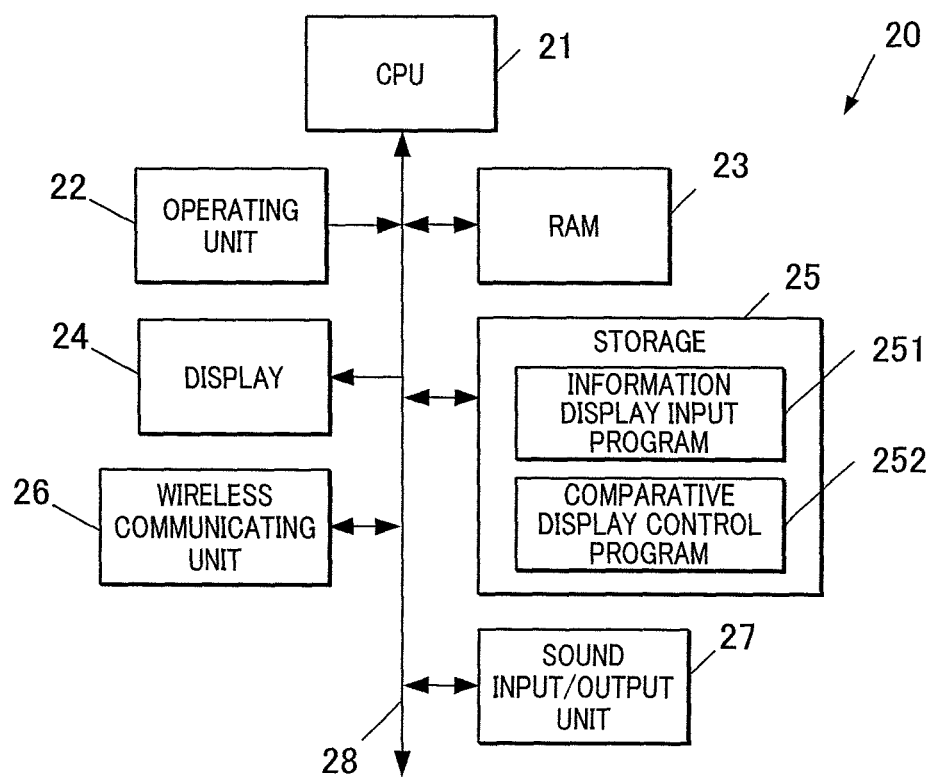
FIG. 3 is a block diagram showing a functional configuration of a terminal apparatus.

As shown in FIG. 2, the server 10 includes a CPU (Central Processing Unit) 11 as a first display controller and a second display controller, an operating unit 12, a RAM (Random Access Memory) 13, a display 14, a storage 15, a communicating unit 16 as a first selecting unit and a second selecting unit, and a timekeeping unit 17. The units of the server 10 are connected to each other through a bus 18.

The CPU 11 controls each unit of the server 10. The CPU 11 reads out a program specified from a system program and application programs stored in the storage 15, and the CPU 11 deploys the program in the RAM 13. The CPU 11 performs various processing in coordination with the program.

The operating unit 12 includes a key input unit such as a keyboard, etc., and a pointing device such as a mouse, etc. The operating unit 12 receives key input and position input, and outputs such operation information to the CPU 11.

The RAM 13 is a volatile memory and forms a work area which temporarily stores various data and programs. The display 14 includes a LCD (Liquid Crystal Display), EL (Electro Luminescence) display, etc., and performs various display according to the display information instructed from the CPU 11.

The storage 15 is a storage unit which includes a HDD (Hard Disk Drive), a SSD (Solid State Drive), etc. and is able to read and write data and programs. Specifically, the storage 15 stores a divided display control program 151 and a later-described stamp data table 30, an account data table 40, a calendar data table 50, a reservation data table 60, a shift data table 70, and the like.

The communicating unit 16 includes a network card, etc. and is connected to a communication network N to communicate with other devices on the communication network N. The CPU 11 is able to communicate with the terminal apparatus 20 on the communication network N through the communicating unit 16.

The timekeeping unit 17 is a real time clock which keeps the present date and time. The timekeeping unit 17 outputs the measured present date/time information to the CPU 11.

The functional configuration of the terminal apparatus 20 is described with reference to FIG. 3. FIG. 3 is a block diagram showing a functional configuration of the terminal apparatus 20.

The terminal apparatus 20 includes a CPU 21, an operating unit 22, a RAM 23, a display 24, a storage 25, a wireless communicating unit 26, and a sound input/output unit 27. The units of the terminal apparatus 20 are connected to each other through a bus 28.

The CPU 21, the RAM 23, and the display 24 are basically the same as the CPU 11, the RAM 13 and the display 14 of the server 10. The redundant description is omitted, and the different portions are mainly described.

The CPU 21 controls each unit of the terminal apparatus 20. The operating unit 22 includes the touch panel provided on the display screen of the display 24, receives the touch input from the user, and outputs the operation information to the CPU 21.

The storage 25 is a storage unit which includes a flash memory, EEPROM (Electrically Erasable Programmable ROM), etc., and is able to read and write data and programs. Specifically, the storage 25 stores the information display input program 251 and the comparison display control program 252.

The wireless communicating unit 26 includes an antenna, a modulation/demodulation circuit, a signal processing circuit, and the like, and transmits and receives information by wireless radio waves with base stations, access points, etc. on a communication network N. Therefore, the CPU 21 is able to communicate with the server 10 through the base stations, access points, etc. on the communication network N by using the wireless communicating unit 26.

The sound input/output unit 27 includes a sound input unit such as a microphone, AD converter, etc., and a sound output unit such as a DA converter, an amplifier, a speaker, etc. When the sound is input, the sound input/output unit 27 receives input of a voice from the user through the microphone, converts the sound input signal to digital sound input information and outputs the above to the CPU 21. When the sound is output, the sound output signal is converted to an analog sound output signal and outputs sound from the speaker. The other components such as the positioning unit in the terminal apparatus 20 as a smartphone are not illustrated and the description is omitted.

A stamp data table 30, an account data table 40, a calendar data table 50, a reservation data table 60, a shift data table 70 stored in a storage 15 of the server 10 are described with reference to FIG. 4 to FIG. 8. FIG. 4 is a diagram showing a configuration of a stamp data table 30. FIG. 5 is a diagram showing a configuration of an account data table 40. FIG. 6 is a diagram showing a configuration of a calendar data table 50. FIG. 7 is a diagram showing a configuration of a reservation data table 60. FIG. 8 is a diagram showing a configuration of a shift data table 70.

The stamp data table 30 is a data table which defines a stamp as a stamp mark displayed on the calendar. As shown in FIG. 4, the stamp data table 30 includes items (fields) such as a stamp number 31, a display 32, a stamp image 33, a task content 34, a message 35, and a display color 36.

The stamp number 31 is identification information of a stamp set for each type of task. The display 32 is information of a character portion of a stamp of the stamp number 31. The stamp image 33 is the display image data of the stamp of the stamp number 31. The stamp image 33 is an enclosed character including one character of the display 32 inside a circle, but the stamp image 33 is not limited to the above. For example, the stamp image 33 can be a stamp image in another shape combining another shape such as a rectangle and a character. The task contents 34 is information of contents set in advance of a task corresponding to a stamp with the stamp number 31. The message 35 is information of a message set in advance of a task corresponding to a stamp with the stamp number 31. In "XX", the name "XX" of the person who registered the task is described.

The display color 36 is information of the pre-set basic display color of the stamp for the stamp number 31. The information of the stamp data 30 is, for example, set in advance by the CPU 11 of the server 10 according to input operation from the user such as the manager through the operating unit 22 of the terminal apparatus 20.

The account data table 40 is a table including the account information of the restaurant worker (user of the terminal apparatus 20). The account data table 40 includes items such as worker number 41, name 42, position 43, role 44, and password 45.

The worker number 41 is identification information of the restaurant worker. According to the present embodiment, the worker number 41 functions as the login ID. The name 42 is information of the name of the worker with the worker number 41. The position 43 is information of the position of the worker with the worker number 41. The role 44 is information regarding the role of the job for the worker with the worker number 41. The password 45 is information regarding the password for the worker with the worker number 41.

The calendar data table 50 is the table including information regarding the attributes when the calendar information of each attribute is generated. The calendar data table 50 includes items such as date 51, day 52, and attribute 53.

The date 51 is information of the date displayed as the calendar information. The day 52 is information of the day of the week displayed as the calendar information. The attribute 53 is information of the attribute of the calendar information. The attribute 53 includes items such as sales 53a, weather 53b, shift 53c, reservation 53d, number of customers 53e, message memo 53f, event 53g, average sales per customer 53h, expenses 53i, etc. According to the present embodiment, calendar information showing the data of attributes such as sales, weather, shift, reservation, number of customers, message memo, event, average sales per customer, expenses, etc., is generated based on the information in the calendar data table 50, and the calendar information is displayed on the terminal apparatus 20. The calendar information of the attributes such as reservation, message memo, and event is made using the stamp image (see FIG. 4) corresponding to the above attributes. As shown in FIG. 6, "N/A" described in the space of the calendar data table 50 shows that the information is not input.

The sales 53a is information of the sales price for each day. The weather 53b is the information of the weather state. The shift 53c is information of the number of workers who are working. The reservation 53d is information of the number of registered reservations (groups). The number of customers 53e is information of the number of customers who visited the restaurant. The message memo 53f is memo information to be notified to the other workers. The event 53g is information of events held around the restaurant. The average sales per customer 53h is information of the amount paid by each customer who visited the restaurant. The expenses 53i is information of the amount of miscellaneous expenses.

The reservation data table 60 is the table including information regarding the registered reservation. The reservation data table 60 includes items such as reservation No. 61, date 62, day 63, time 64, representative name 65, number of people 66, phone number 67, others 68, and reservation registration submitter 69.

The reservation No. 61 is identification information of the registered reservation. The date 62 is information of the date of the registered reservation. The day 63 is information of the day of the week of the registered reservation. The time 64 is information of the time of the registered reservation. The representative name 65 is the information of the name of the person who made the reservation. The number of people 66 is information of the number of people in the party of the reservation. The phone number 67 is information of the phone number of the person who made the reservation. The others 68 is information regarding the reservation other than the items described above. The reservation submitter 69 is information of the name of the submitter who is the worker who registered the reservation.

The shift data table 70 is a table including information regarding the work shift. The shift data table 70 includes items such as date 71, day 72, number of workers 73, and name of workers 74.

The date 71 is information of the date when the worker works. The day 72 is information of the day of the week when the worker works. The number of workers 73 is information of the number of workers who work. The worker name 74 is information of the name of the worker who works. "N/A" described in the item of the worker name 74 shows that this information is not input.

Figure 10:
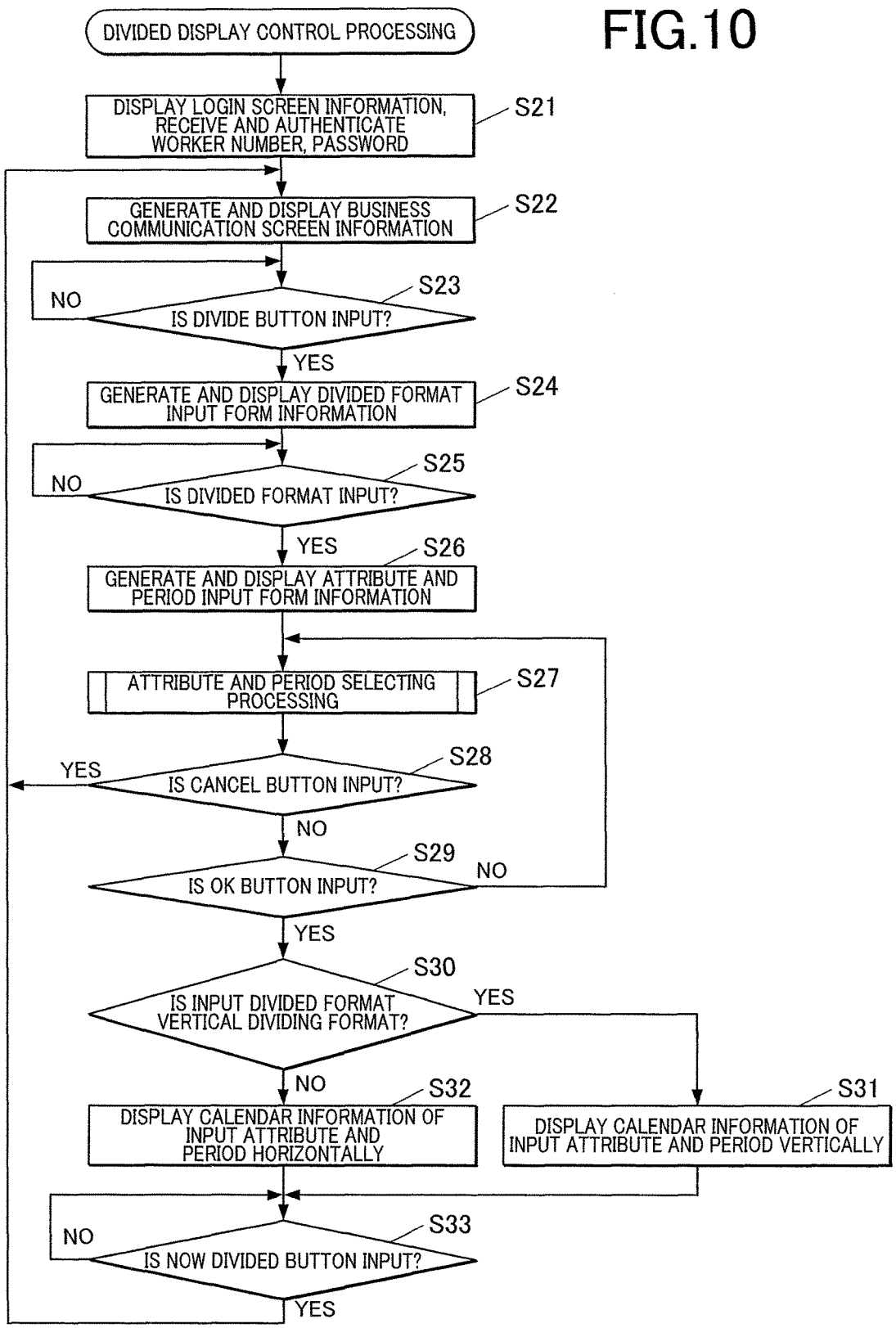
FIG. 10 is a flowchart showing divided display control processing.
Figure 11:
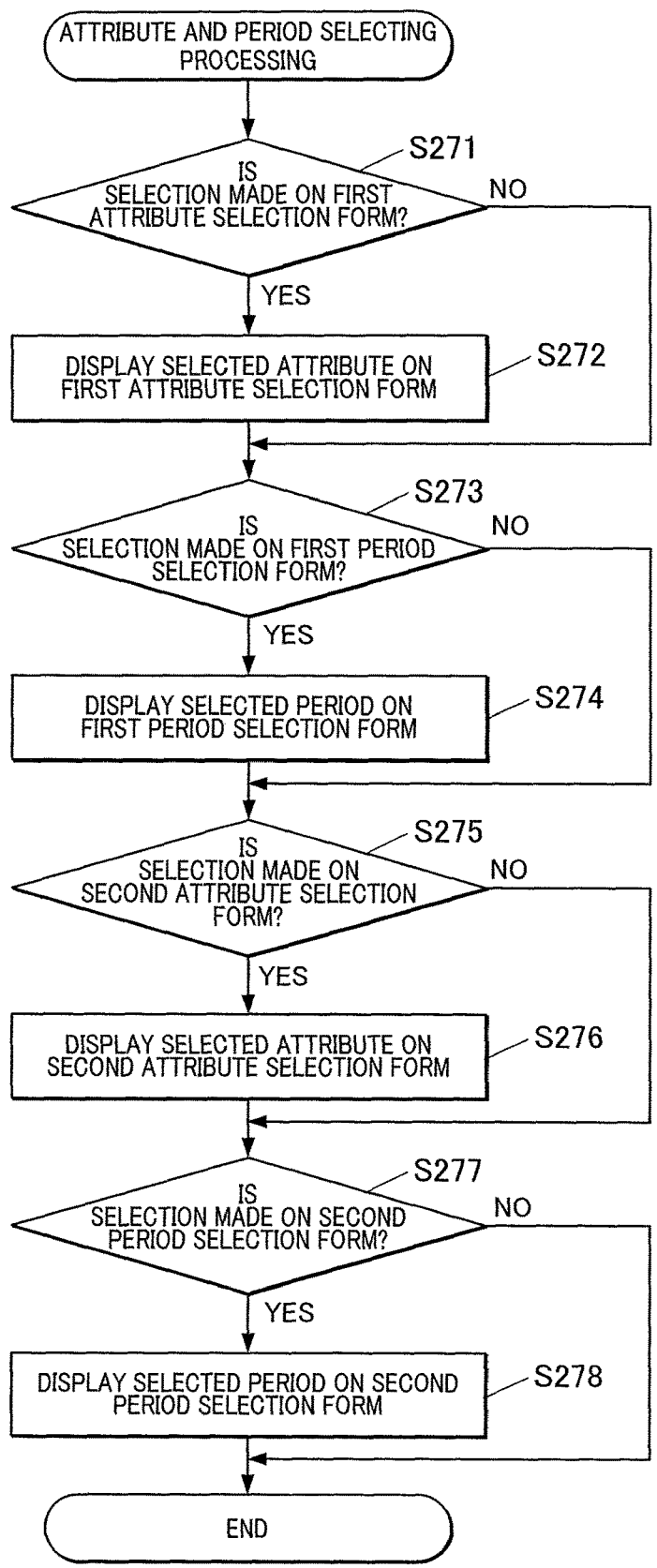
FIG. 11 is a flowchart showing attribute and period selecting processing.

The operation of the store data management system 1 is described with reference to FIG. 9 to FIG. 19B. FIG. 9 is a flowchart showing information display input processing. FIG. 10 is a flowchart showing divided display control processing. FIG. 11 is a flowchart showing attribute and period selecting processing. FIG. 12 is a flowchart showing comparison display control processing. FIG. 13A, FIG. 13B, FIG. 14A, and FIG. 14B are diagrams showing a display screen of a terminal apparatus 20 in a situation when the divided display control processing is performed. FIG. 15A is a diagram showing an example of a list of selection items displayed in a first attribute selection form or a second attribute selection form. FIG. 15B is a diagram showing an example of a list of selection items displayed in a first period selection form or a second period selection form. FIG. 16A, FIG. 16B, FIG. 17A and FIG. 17B are diagrams showing a display screen of a terminal apparatus 20 in a situation when the divided display control processing is performed. FIG. 18A, FIG. 18B, FIG. 19A, and FIG. 19B are diagrams showing a display screen of a terminal apparatus 20 in a situation when comparison display control processing is performed.

The information display input processing performed by the terminal apparatus 20 is described with reference to FIG. 9. The information display input processing is processing which displays display information regarding the divided display control processing and receives input of information. In the terminal apparatus 20, the user inputs through the operating unit 22 instruction to perform the information display input processing. This triggers the CPU 21 to perform information display input processing in coordination with the information display input program 251 readout from the storage 25 and deployed in the RAM 23.

First, the CPU 21 determines whether the instruction to end the information display input processing is input through the operating unit 22 (step S11).

In step S11, when it is determined that the end instruction is input (step S11; YES), the CPU 21 ends the information display input processing.

In step S11, when it is determined that the end instruction is not input (step S11; NO), the CPU 21 determines whether the display information is received from the server 10 through the wireless communicating unit 26 (step S12).

In step S12, when it is determined that the display information is received (step S12; YES), the CPU 21 displays the received display information on the display 24 (step S13). Then, the CPU 21 determines whether information is input by operation through the operating unit 22 (with the exception of the end instruction) or by sound through the sound input/output unit 27 (step S14). In step S12, when it is determined that the display information is not received (step S12; NO), the processing skips step S13 and advances to step S14.

In step S14, when it is determined that the information is input (step S14; YES), the CPU 21 transmits the input information (operation information, text information, sound information, etc.) input in step S14 to the server 10 through the wireless communicating unit 26 (step S15), and advances the processing to step S11.

In step S14, when it is determined that the information is not input (step S14; NO), the processing advances to step S11.

The divided display control processing performed in server 10 is described with reference to FIG. 10 to FIG. 17B. The divided display control processing is processing which divides the display region of the display 24 in the terminal apparatus 20 and displays the calendar information in each divided region. The calendar information is a schedule with a schedule template provided with a plurality of schedule frames in a predetermined format. Each of the plurality of schedule frames is corresponded with predetermined date information or time span information. According to the present embodiment, the calendar information has a schedule frame which shows the date, and a plurality of dates are displayed at once aligned in sequential order. Specifically, the calendar information according to the present embodiment uses a schedule template (see FIG. 20A) in which a plurality of schedule frames are aligned in a grid and displayed at once with one week shown as one horizontal line. Each of the plurality of schedule frames is corresponded with predetermined date information. With this, the calendar information of the present embodiment is a schedule in a form of a monthly calendar.

In the terminal apparatus 20 for a certain worker, corresponding to step S14 of the information display input processing shown in FIG. 9, an instruction to perform the divided display control processing may be input and the instruction to perform the divided display control processing may be transmitted to the server 10 in step S15. Here, in the server 10, corresponding to step S15 in FIG. 9, when the instruction to perform the divided display control processing is received from the terminal apparatus 20 through the communicating unit 16, the CPU 11 performs the divided display control processing in coordination with the divided display control program 151 readout from the storage 15 and deployed in the RAM 13.

First, the CPU 11 generates the login screen information. Corresponding to steps S12, S15 in the information display input processing shown in FIG. 9, the CPU 11 transmits the generated login screen information through the communicating unit 16 to the terminal apparatus 20 which is the communication partner and displays the login screen. The worker number as the login ID and the password is received from the terminal apparatus 20 which is the communication partner. The account data table 40 is read out from the storage 15 and the login authentication is performed using the received worker number, the received password, and the account data table 40 (step S21). The login screen information includes an input region for the login ID and the password.

That is, corresponding to step S21, in steps S12, S13 shown in FIG. 9, the CPU 21 of the terminal apparatus 20 receives and displays the login screen information, and in steps S14, S15 shown in FIG. 9, the CPU 21 of the terminal apparatus 20 receives input of the worker number of the login ID and password through the operating unit 22, and transmits the input information to the server 10.

Then, the CPU 11 performs login authentication depending on whether the received worker number and the received password are in the record of the worker number 41 and the password 45 in the account data table 40.

Moreover, the CPU 11 obtains the present date/time information from the timekeeping unit 17, and reads out the stamp data table 30, the calendar data table 50, etc. from the storage 15. The CPU 11 uses the present date/time information, the stamp data table 30, the account data table 40, the calendar data table 50, etc. and generates business communication screen information corresponding to the user authenticated in step S11. Corresponding to step S12 shown in FIG. 9, the generated business communication screen information is transmitted to the terminal apparatus 20 which is the communication partner through the communicating unit 16 and displayed (step S22).

In step S22, the CPU 11 prepares the calendar information for the month corresponding to the present time information and positions the stamp image 33 of the stamp which needs to be displayed on the corresponding date in the calendar information. The CPU 11 generates the business communication screen information including a display region of the calendar information with the stamp attached, a display region for the name 42 of the worker who logged in, a stamp button selection region to register the stamp, a To Do button, and a divide button. The color of the stamp on the calendar information is set to the display color of the display color 36. In the business communication screen information, the stamp number can be specified by stamp button input in the stamp button input region.

That is, corresponding to step S22, the CPU 21 of the terminal apparatus 20 performs reception and display of the business communication screen information in steps S12, S13 shown in FIG. 9. In step S22, the business communication screen information representing the business communication screen 300A shown in FIG. 13A and FIG. 16A, for example, is generated.

The business communication screen 300A includes a login user display region 310, a divide button 320, a To Do button 330, a calendar display region 340, and a stamp button selection region 350. The login user display region 310 is a display region for the login user. The business communication screen 300A is an example for when the login user in the login user display region 310 is the store manager Jiro YAMADA.

The divide button 320 is a button to receive input to divide the calendar display region 340 and to display (comparison display) the calendar information of the attribute and the period (display period) desired by the user in each divided display region. The To Do button 330 is a button to receive input to display a list of tasks which are due on the day the worker logs in.

The calendar display region 340 is a display region of calendar information provided with the stamp on the calendar of the month when the worker logs in. For example, the calendar display region 340 includes a reservation task stamp 341, a message task stamp 342, and an event task stamp 343. The stamp of the calendar display region 340 can be input by touch by the user.

The stamp button selection region 350 is a display region including a selection stamp button when the stamp is registered. The stamp button selection region 350 includes task stamp buttons such as order stamp button 351, plan stamp button 352, and event stamp button 353, and other display button 354. The stamp buttons 351, 352, 353 are positioned from the left to right in a time series order starting from the stamp button with the date of the past use closer to the present date based on stamp button use history information (not shown). The other display button 354 is a button to receive touch input to display stamp buttons other than the stamp buttons 351, 352, and 353. For example, when the button is touched, information showing a list of other stamp buttons is displayed.

Corresponding to step S22, in steps S14, S15 shown in FIG. 9, the CPU 21 of the terminal apparatus 20 receives through the operating unit 22 input of the divide button 320, the To Do button 330, the stamp of the calendar display region 340 or the stamp button in the stamp button selection region 350 and transmits input information to the server 10.

Then, corresponding to step S15 shown in FIG. 9, the CPU 11 determines whether the divide button 320 is input according to whether the touch input information of the divide button 320 is received from the terminal apparatus 20 which is the communication partner through the communicating unit 16 (step S23).

In step S23, when it is determined that the divide button 320 is not input (step S23; NO), the CPU 11 performs the determining processing of step S23 until it is determined that the divide button 320 is input.

In step S23, when it is determined that the divide button 320 is input (step S23; YES), the CPU 11 generates the divided format input form information, and corresponding to step S12 shown in FIG. 9, the CPU 11 transmits the generated divided format input form information to the terminal apparatus 20 which is the communication partner through the communicating unit 16 and displays the information (step S24).

That is, corresponding to step S24, in steps S12, S13 shown in FIG. 9, the CPU 21 of the terminal apparatus 20 receives and displays the divided format input form information. In step S24, for example, the divided format input form information is generated to display a divided format input form 360 in a bubble shape included in the display screen 300B shown in FIG. 13B, FIG. 16B. The divided format input form 360 includes a "divide horizontally" button 361 and a "divide vertically" button 362.

Figure 17A:
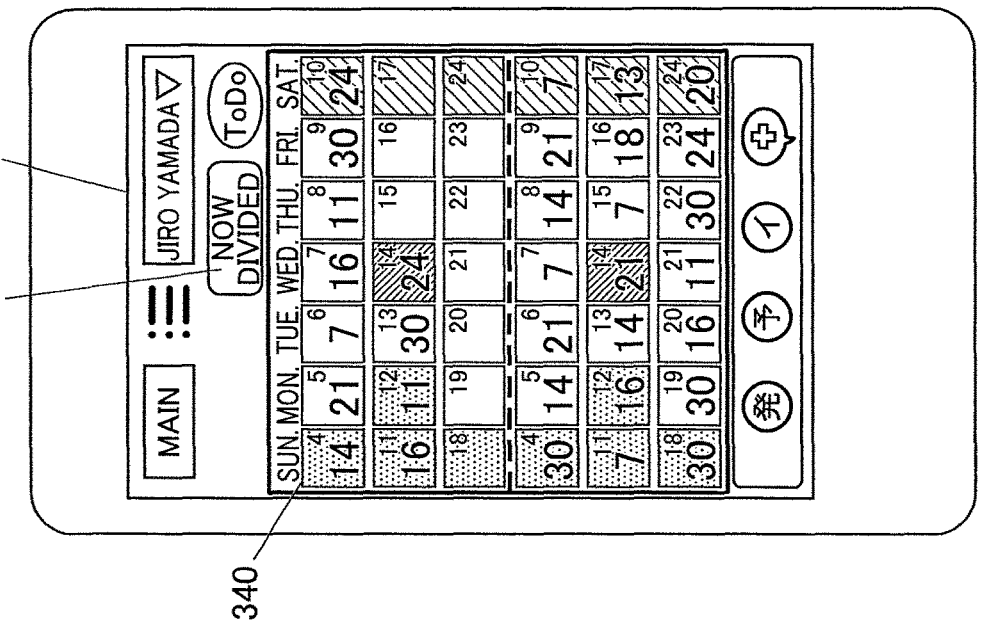
FIG. 17A and FIG. 17B are diagrams showing an example of a display screen of a terminal apparatus which performs the divided display control processing.
Figure 17B:
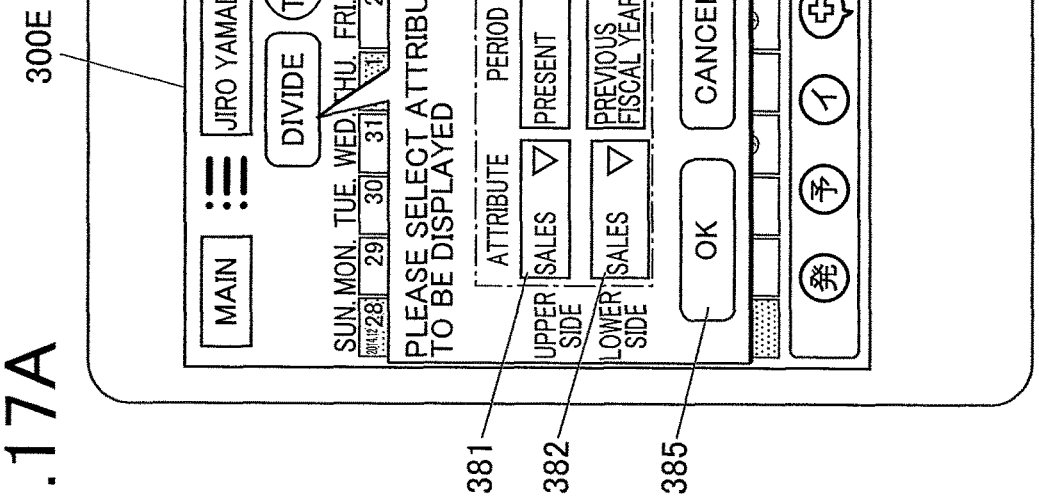
Figure 18B:
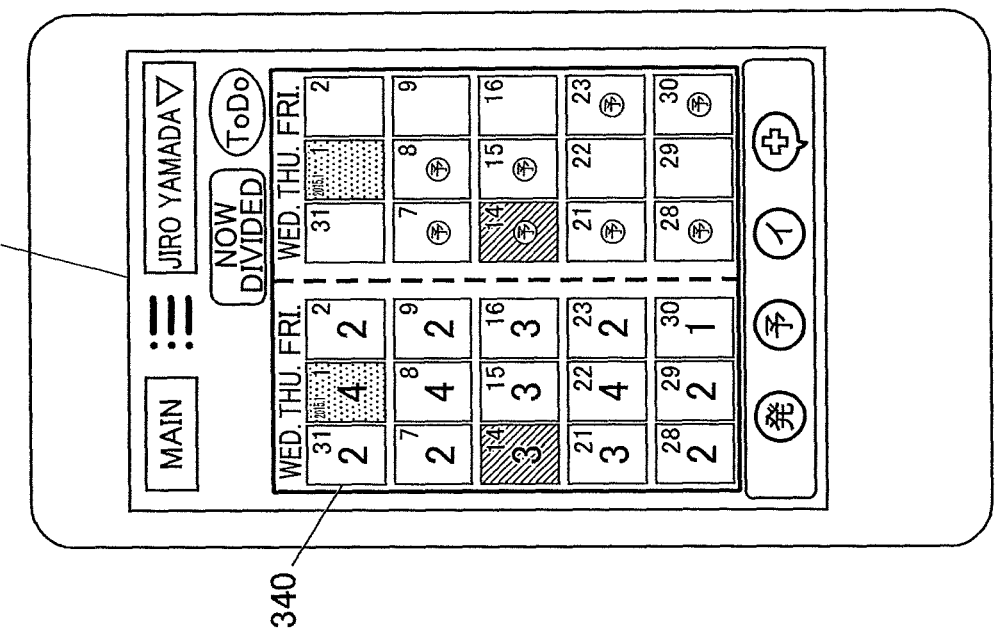
FIG. 18A and FIG. 18B are diagrams showing an example of a display screen of a terminal apparatus which performs the comparison display control processing.
Figure 18A:
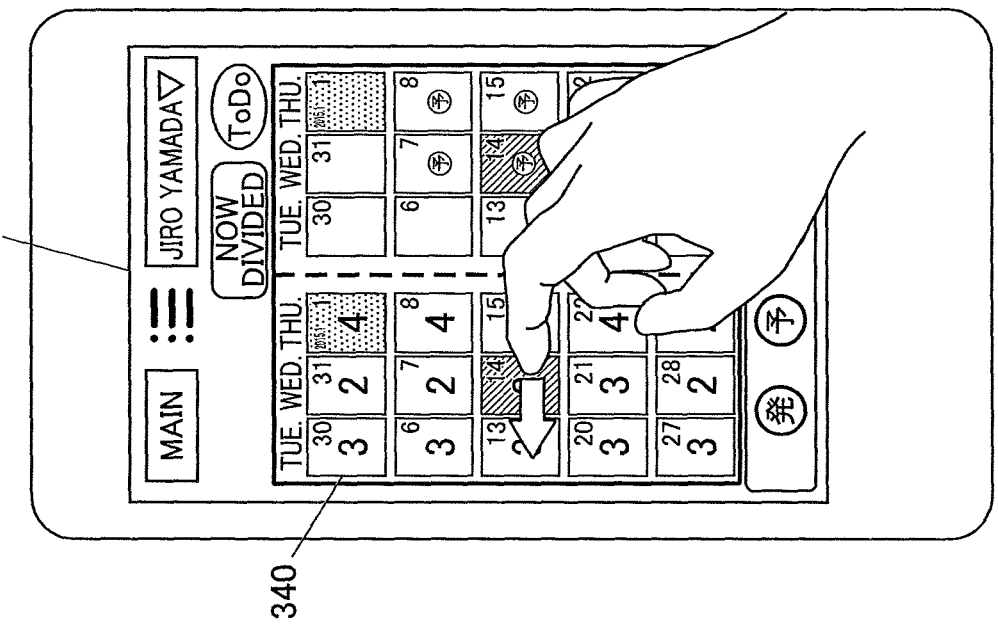

As shown in FIG. 17B, the "divide horizontally" button 361 is a button to receive input to divide the calendar display region 340 between an upper side display region and a lower side display region.

Figure 14B:
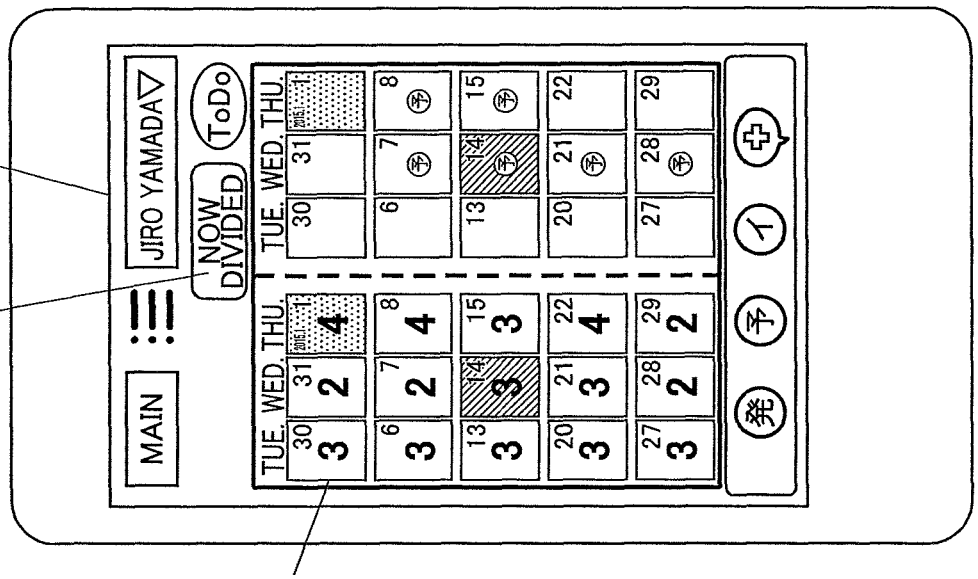
FIG. 14A and FIG. 14B are diagrams showing an example of a display screen of a terminal apparatus which performs divided display control processing.

As shown in FIG. 14B, the "divide vertically" button 362 is a button to receive input to divide the calendar display region 340 between a left side display region and a right side display region.

Corresponding to step S24, in steps S14 and S15 shown in FIG. 9, the CPU 21 of the terminal apparatus 20 receives input through the operating unit 22 specifying the "divide horizontally" button 361 or the "divide vertically" button 362, and transmits the input information to the server 10.

Then, corresponding to step S15 shown in FIG. 9, the CPU 11 determines whether the "divide horizontally" button 361 or the "divide vertically" button 362 is input according to whether the touch input information of the "divide horizontally" button 361 or the "divide vertically" button 362 is received from the terminal apparatus 20 which is the communication partner through the communicating unit 16.

In step S25, when it is determined that both the "divide horizontally" button 361 and the "divide vertically" button 362 are not input (step S25; NO), the CPU 11 performs determining processing of step S25 until it is determined whether the "divide horizontally" button 361 or the "divide vertically" button 362 is input.

Then, in step S25, when it is determined that the "divide horizontally" button 361 or the "divide vertically" button 362 is input (step S25; YES), the CPU 11 generates the attribute and the period input form information. Corresponding to step S12 shown in FIG. 9, the generated attribute and period input form information is transmitted to the terminal apparatus 20 which is the communication partner through the communicating unit 16 and the information is displayed (step S26).

That is, corresponding to step S26, in steps S12, S13 shown in FIG. 9, the CPU 21 of the terminal apparatus 20 receives the attribute and period input form information and displays the information.

Figure 13B:
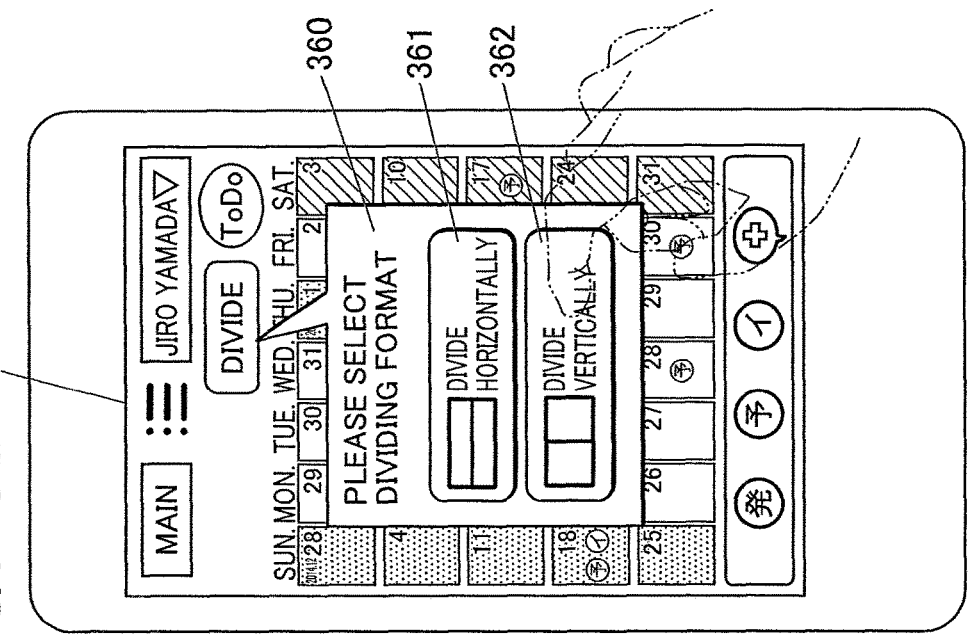
FIG. 13A and FIG. 13B are diagrams showing an example of a display screen of a terminal apparatus which performs divided display control processing.
Figure 13A:
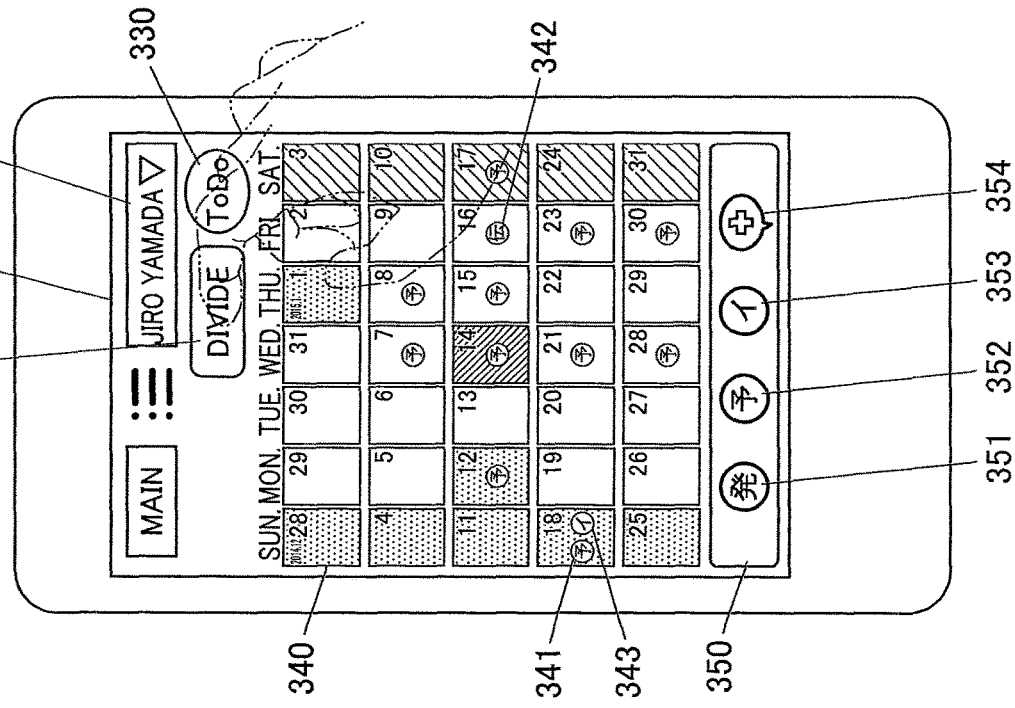
Figure 14A:
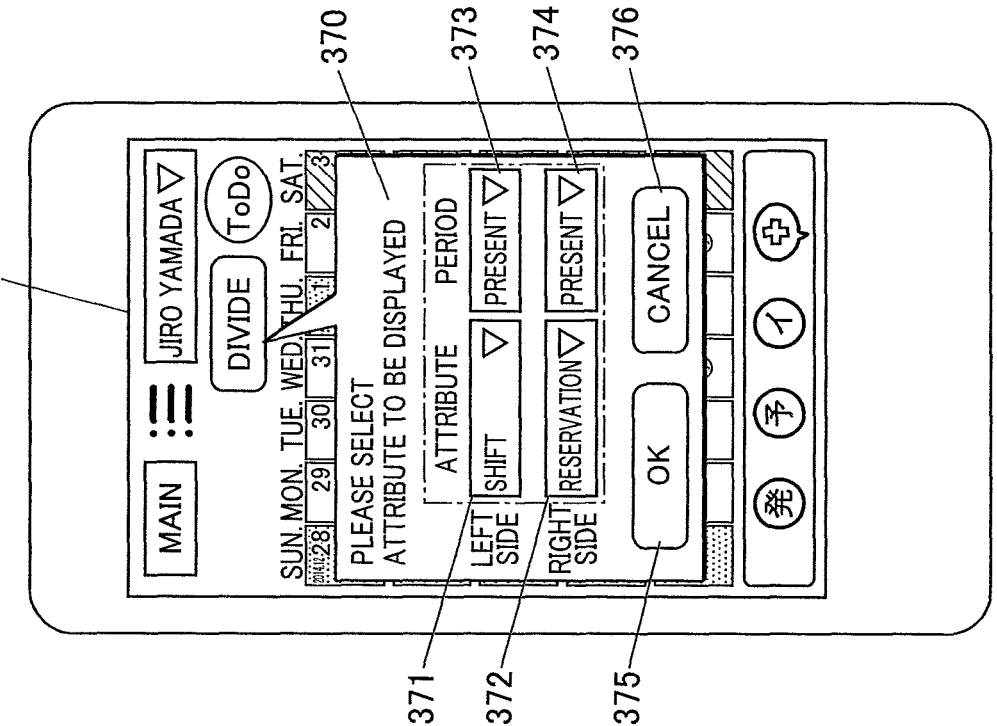

Specifically, as shown in FIG. 13B, when input by touching the "divide vertically" button 362 is made, and it is determined that the "divide vertically" button 362 is input in step S25 (step S25; YES), in step S26, for example, the attribute and period input form information to display an attribute and period input form 370 in a bubble shape included in the display screen 300C shown in FIG. 14A is generated. Alternatively, as shown in FIG. 16B, when input by touching the "divide horizontally" button 361 is made and it is determined that the "divide vertically" button 361 is input in step S25 (step S25; YES), in step S26, for example, the attribute and period input form information to display an attribute and period input form 380 in a bubble shape included in the display screen 300E shown in FIG. 17A is generated.

As shown in FIG. 14A, the attribute and period input form 370 includes a first attribute selection form 371, a second attribute selection form 372, a first period selection form 373, a second period selection form 374, an OK button 375, and a cancel button 376.

The first attribute selection form 371 is a form to select the attribute of the calendar information displayed in the left display region in the calendar display region 340. The second attribute selection form 372 is a form to select the attribute of the calendar information displayed in the right display region in the calendar display region 340.

The first attribute selection form 371 and the second attribute selection form 372 are both pulldown format selection forms. For example, specifically, when the user touches the first attribute selection form 371, as shown in FIG. 15A, the attribute selection items are displayed as a list. The display example shown in FIG. 15A displays the item "shift" at the top of the list with a triangle. This shows that "shift" is the attribute in the selected state. When the second attribute selection form 372 is touched, the list similar to the list shown in FIG. 15A is displayed.

The first period selection form 373 is a form to select the display period of the calendar information displayed in the left display region in the calendar display region. The second period selection form 374 is a form to select the display period of the calendar information displayed in the right display region in the calendar display region 340.

The first period selection form 373 and the second period selection foils 374 are pulldown format selection forms. Specifically, for example, when the user touches the first period selection form 373, as shown in FIG. 15E, the selection item list of the display period is displayed. The display example shown in FIG. 15B, displays the item "present" at the top of the list with a triangle. This shows that "present" is the display period in the selected state. When the second period selection form 374 is touched, the list similar to the list shown in FIG. 15B is displayed.

The OK button 375 is a button which receives the determined selection information selected in the attribute and period input form 370.

The cancel button 376 is a button which receives canceled selection information selected in the attribute and period input form 370.

As shown in FIG. 17A, the attribute and period input form 380 includes a first attribute selection form 381, a second attribute selection form 382, a first period selection form 383, a second period selection form 384, an OK button 385, and a cancel button 386.

The first attribute selection form 381 is a form to select the attribute of the calendar information displayed in the upper display region in the calendar display region. The second attribute selection form 382 is a form to select the attribute of the calendar information displayed in the lower display region in the calendar display region 340.

Similar to the above-described first attribute selection form 371 and the second attribute selection form 372, the first attribute selection form 381 and the second attribute selection form 382 are both pulldown format selection forms. The selection items of the attribute in the first attribute selection form 381 and the second attribute selection form 382 are similar to the first attribute selection form 371 and the second attribute selection form 372, and the description is omitted.

The first period selection form 383 is a form to select the display period of the calendar information displayed in the upper display region of the calendar display region 340. The second period selection form 384 is a form to select the display period of the calendar information displayed in the lower display region of the calendar display region 340.

Similar to the above-described first period selection form 373 and the second period selection form 374, the first period selection form 383 and the second period selection form 384 are both pulldown format selection forms. The selection items of the display period in the first period selection form 383 and the second period selection form 384 are similar to the first period selection form 373 and the second period selection form 374, and the description is omitted.

The OK button 385 is a button which receives the determined selection information selected in the attribute and period input form 380.

The cancel button 386 is a button which receives the canceled selection information selected in the attribute and period input form 380.

The CPU 11 performs the attribute and period selecting processing (step S27). The details of the attribute and period selecting processing are described below.

Corresponding to steps S26, S27, in steps S14, S15 shown in FIG. 9, the CPU 21 of the terminal apparatus 20 receives input of the OK buttons 375, 385 or the cancel buttons 376, 386 through the operating unit 22 and transmits the input information to the server 10.

Then, corresponding to step S15 shown in FIG. 9, the CPU 11 determines whether the cancel buttons 376, 386 are input according to whether the touch input information of the cancel buttons 376, 386 are received from the terminal apparatus 20 which is the communication partner through the communicating unit 16 (step S28).

In step S28, when it is determined that the cancel buttons 376, 386 are input (step S28; YES), the processing advances to step S22.

In step S28, when it is determined that the cancel buttons 376, 386 are not input (step S28; NO), corresponding to step S15 shown in FIG. 9, the CPU 11 determines whether the OK buttons 375, 385 are input according to whether the touch input information of the OK buttons 375, 385 are received from the terminal apparatus 20 which is the communication partner through the communicating unit 16 (step S29).

In step S29, when it is determined that the OK buttons 375, 385 are not input (step S29; NO), the processing advances to step S27.

In step S29, when it is determined that the OK buttons 375, 385 are input (step S29; YES), the CPU 11 determines whether the divided format input in step S25 is the vertical dividing format (step S30).

In step S30, when it is determined that the dividing format is the vertical dividing format (step S30; YES), as shown in FIG. 14A, the CPU 11 obtains the attribute and period information selected in the first attribute selection form 371 and the first period selection form 373 from the calendar data table 50 and generates the calendar information displayed in the left display region in the calendar display region 340. The CPU 11 also obtains the information of the attribute and period selected in the second attribute selection form 372 and the second period selection form 374 from the calendar data table 50 and generates the calendar information displayed in the right display region in the calendar display region 340. Corresponding to step S12 shown in FIG. 19, the CPU 11 transmits the generated calendar information to the terminal apparatus 20 which is the communication partner through the communicating unit 16 and displays the calendar information corresponding to each of the left and right display regions in the calendar display region 340 (step S31). With this, the processing advances to step S33.

That is, corresponding to step S31, in steps S12, S13 shown in FIG. 9, the CPU 21 of the terminal apparatus 20 receives and displays the calendar information. For example, in step S31, the calendar information included in the display screen 300D shown in FIG. 14B is generated. In the display screen 300D, in the left side display region of the calendar display region 340, the calendar information with the attribute set to shift and the display period set to present is displayed. In the right side display region, the calendar information with the attribute set to reservation and the display period set to present is displayed. Therefore, the number of people in the shift of the month at the time of login and the condition of the reservations can be displayed in a comparison display. Therefore, it is possible to easily consider measures to be taken to increase or decrease the staff.

Here, now divided button 390 is displayed above the calendar display region 340. The now divided button 390 shows that the calendar information is now being displayed in the divided display regions in the calendar display region 340. The now divided button can receive input by touch to cancel such state.

Here, the display mode of the calendar information displayed in the left display region and the right display region of the calendar display region 340 is described in detail. As shown in FIG. 14B, when the display period is present, the calendar information at the time of login is displayed. The calendar information is displayed limited to the schedule frame (date frame) of the column of the day showing the day of login (Jan. 14, 2015) and the schedule frame (date frame) of the column of the day of the week before and after the login date. However, when the day of login is Sunday, the calendar information is displayed limited to three schedule frames (date frame) showing Sunday, Monday, and Tuesday. When the day of login is Saturday, the calendar information is displayed limited to three schedule frames (date frame) showing Thursday, Friday, and Saturday.

For example, when the display period is the previous fiscal year, the calendar information showing the fiscal year previous to the year of the login date and the same month as the login date is displayed. When the display period is the next fiscal year, the calendar information showing the fiscal year after the year of the login date and the same month as the login date is displayed.

When the display period is the previous month, the calendar information showing the month previous to the month of the login date is displayed. When the display period is the next month, the calendar information showing the month after the month of the login date is displayed.

When the display period is previous week, the calendar information of the month of the login date is displayed but the week including the login date is displayed shifted one row downward. When the display period is next week, the calendar information of the month of the login date is displayed but the week including the login date is displayed shifted one row upward.

Regardless of the item that is selected as the display period, the schedule frame displayed is limited to the schedule frame of the column of the day of the week before and after the column of the day of the week of the login date.

In step S30, when it is determined that the divided format is not the vertical divided format (step S30; NO), as shown in FIG. 17A, the CPU 11 obtains the attribute and period information selected in the first attribute selection form 381 and the first period selection form 383 from the calendar data table 50, and generates the calendar information displayed in the upper display region in the calendar display region 340. The CPU 11 also obtains the attribute and period information selected in the second attribute selection form 382 and the second period selection form 384 from the calendar data table 50, and generates the calendar information displayed in the lower display region in the calendar display region 340. Corresponding to step S12 shown in FIG. 9, the CPU 11 transmits the generated calendar information to the terminal apparatus 20 which is the communication partner through the communicating unit 16 and displays calendar information corresponding to each of the upper and lower display region in the calendar display region 340 (step S31). With this, the processing advances to step S32.

That is, corresponding to step S32, in steps S12, S13 shown in FIG. 9, the CPU 21 of the terminal apparatus 20 receives and displays the calendar information. In step S32, for example, the calendar information included in the display screen 300F shown in FIG. 17B is generated. In the display screen 300F, the calendar information with the attribute set to sales and the display period set to present is displayed in the upper display region in the calendar display region 340. In the low display region, the calendar information with the attribute set to sales and the display period set to previous fiscal year is displayed. Therefore, the sales of the month of the login date and the same month in the previous fiscal year are displayed in the comparison display, and it becomes easy to plan the future sales policies.

Here, the now divided button 390 is displayed above the calendar display region 340.

Here, the display mode of the calendar information displaying the upper display region and the lower display region in the calendar display region 340 is described in detail. As shown in FIG. 17B, when the display period is present, the calendar information of the month of login is displayed and the calendar information is displayed limited to schedule frame (date frame) of the row of the week including the date of login (Jan. 14, 2015) and the schedule frame (date frame) of the row of the week before and after the login date.

For example, when the display period is the previous fiscal year, the calendar information in the year before the login date and with the same month as the login date is displayed. When the display period is the next fiscal year, the calendar information in the year after the login date and with the same month as the login date is displayed.

When the display period is the previous month, the calendar information of the month previous to the login date is displayed. When the display period is the next month, the calendar information of the month after the login date is displayed.

When the display period is previous week, the schedule frame of the row of the week including the login date and the schedule frame of the row of the previous week and the week before the previous week are displayed. When the display period is next week, the schedule frame of the row of the week including the login date and the schedule frame of the row of the next week and the week after the next week are displayed.

When items other than next week and previous week are selected as the display period, the display is limited to the schedule frame of the row of the week including the login date and the schedule frame of the row of the week before and after the login date.

In steps S14, S15 shown in FIG. 9, corresponding to step S31 or step S32, the CPU 21 of the terminal apparatus 20 receives the input of the now divided button 390 through the operating unit 22 and transmits the input information to the server 10.

Then, corresponding to step S15 shown in FIG. 9, the CPU 11 determines whether the now divided button 390 is input according to whether the touch input information of the now divided button 390 is received from the terminal apparatus 20 which is the communication partner through the communicating unit 16 (step S33).

In step S33, when it is determined that the now divided button 390 is not input (step S33; NO), the CPU 11 performs determining processing of step S33 until it is determined that the now divided button 390 is input.

Then, when it is determined that the now divided button 39 is input in step S33 (step S33; YES), the processing advances to step S22. That is, when the now divided button 390 is touched, the state of displaying the calendar information in each display region divided in the calendar display region 340 is canceled.

The attribute and period selecting processing performed by the server 10 is described with reference to FIG. 11.

First, corresponding to step S15 shown in FIG. 9, the CPU 11 determines whether the selection is made in the first attribute selection forms 371, 381 according to whether the touch input information of the first attribute selection forms 371, 381 is received from the terminal apparatus 20 which is the communication partner through the communicating unit 16 (step S271).

When it is determined that the selection is made in the first attribute selection forms 371, 381 in step S271 (step S271; YES), the CPU 11 displays the selected attribute in the first attribute selection form 371, 381 (step S272).

In step S271, when it is determined that the selection is not made in the first attribute selection forms 371, 381 (step S271; NO), the processing skips step S272, and advances to step S273.

Corresponding to step S15 shown in FIG. 9, the CPU 11 determines whether the selection is made in the first period selection forms 373, 383 according to whether the touch input information of the first period selection forms 373, 383 is received from the terminal apparatus 20 which is the communication partner through the communicating unit 16 (step S273).

In step S273, when it is determined that the selection is made in the first period selection forms 373, 383 (step S273; YES), the CPU 11 displays the selected period in the first period selection form 373, 383 (step S274).

In step S273, when it is determined that the selection is not made in the first period selection forms 373, 383 (step S273; NO), the processing skips step S274, and the advances to step S275.

Then, corresponding to step S15 shown in FIG. 9, the CPU 11 determines whether the selection is made in the second attribute selection forms 372, 382 according to whether the touch input information of the second attribute selection forms 372, 382 are received from the terminal apparatus 20 which is the communication partner through the communicating unit 16 (step S275).

In step S275, when it is determined that the selection is made in the second attribute selection forms 372, 382 (step S275; YES), the CPU 11 displays the selected attribute in the second attribute selection forms 372, 382 (step S276).

In step S275, when it is determined that the selection is not made in the second attribute selection forms 372, 382 (step S275; NO), the processing skips step S276, and advances to step S277.

Then, corresponding to step S15 shown in FIG. 9, the CPU 11 determines whether the selection is made in the second period selection forms 374, 384 according to whether the touch input information of the second period selection forms 374, 384 are received from the terminal apparatus 20' which is the communication partner through the communicating unit 16 (step S277).

In step S277, when it is determined that the selection is made in the second period selection forms 374, 384 (step S277; YES), the CPU 11 displays the selected period in the second period selection forms 372, 384 (step S278), and the attribute and the period selecting processing ends.

In step S277, when it is determined that the selection is not made in the second period selection forms 374, 384 (step S277; NO), the processing skips step S278 and ends the attribute and period selecting processing.

The comparison display control processing performed in the terminal apparatus 20 is described with reference to FIG. 12, FIG. 18A, FIG. 18B, FIG. 19A, and FIG. 19B.

When the instruction to perform the comparison display control processing is input through the operating unit 22 on the terminal apparatus 20, the CPU 21 performs the comparison display control processing in coordination with the comparison display control program 252 read out from the storage 25 and deployed in the RAM 23. Specifically, for example, when the OK buttons 375, 385 are touched, the CPU 21 performs the comparison display control processing.

First, the CPU 21 determines whether the scroll operation is performed through the operating unit 22 in one display region of the calendar display region 340 (step S41). Specifically, when the calendar display region 340 is divided vertically (vertical dividing), the CPU 21 determines whether there is scrolling in the left and right direction through the operating unit 22 in the left display region of the calendar display region 340. When the calendar display region 340 is divided horizontally, (horizontal dividing), the CPU 21 determines whether there is scrolling in the up and down direction through the operating unit 22 in the upper display region of the calendar display region 340.

In step S41, when it is determined that the scrolling is performed through the operating unit 22 (step S41; YES), the CPU 21 scrolls the display in the calendar information displayed on the calendar display region 340 according to the scrolling operation (step S42), and the processing advances to step S43. For example, specifically, when the calendar display region 340 is divided vertically, as shown in the display screen 300G shown in FIG. 18A, when the scrolling is performed in a moving amount for one frame of the date frame in the left direction starting from a display position of a date frame (schedule frame) of Jan. 14, 2015 in the calendar information displayed in the left display region, the CPU 21 displays the calendar information while moving the calendar information displayed in the left display region in the left direction. The CPU 21 displays the calendar information displayed in the right display region in coordination with the calendar information in the left display region. When the scrolling ends, as shown in the display screen 300H in FIG. 18B, the calendar information displayed in the left and right display region slide one frame of the date frame in the left direction, and the calendar information of the three date frames showing Tuesday, Wednesday, and Thursday originally displayed is changed to the calendar information of the three date frames showing Wednesday, Thursday, and Friday and displayed.

In step S41, when it is determined that scrolling is not performed (step S41; NO), the processing skips step S42 and advances to step S43, In step S43, the CPU 21 determines whether there is long pressing in one of the date frames of one display region of the calendar display region 340 through the operating unit 22 (step S43).

In step S43, when it is determined that long pressing is performed (step S43; YES), the CPU 21 displays a detailed screen showing details of information shown in the date frame pressed for a long time. The CPU 21 also displays the detailed screen showing details of information shown in the date frame in the other display region corresponding to the date frame pressed for a long time (step S44). With this, the processing advances to step S45. Specifically, for example, when the calendar display region 340 is divided vertically, as shown in the display screen 300I shown in FIG. 19A, when long pressing is performed in the date frame (schedule frame) of Jan. 7, 2015 of the calendar information displayed in the left display region, as shown in the display screen 300J shown in FIG. 19B, the CPU 21 displays the detailed screen 410 showing the details of the shift shown in the date frame which is pressed for a long period of time. The CPU 21 also displays the detailed screen 420 of the corresponding date frame in the right display region showing the details of the reservation in the column of Wednesday and in the date frame of the second week, similar to the long pressed date frame. When the detailed screens 410, 420 are displayed, the text information, etc. displayed on the screen can be edited by the user by touching the screen.

In step S43, when it is determined that long pressing operation is not performed (step S43; NO), the processing skips step S44, and advances to step S45.

In step S45, the CPU 21 determines whether there is scrolling through the operating unit 22 in the other display region of the calendar display region 340 (step S45). Specifically, when the calendar display region 340 is divided vertically (vertical dividing), the CPU 21 determines whether there is scrolling in the left and right direction through the operating unit 22 in the right region of the calendar display region 340. When the calendar display region 340 is divided horizontally (horizontal dividing) the CPU 21 determines whether there is scrolling in the up and down direction in the lower display region of the calendar display region 340 through the operating unit 22.

In step S45, when it is determined that the scrolling operation is performed (step S45; YES), the CPU 21 scrolls the display of the calendar information displayed in the calendar display region 340 similar to the scrolling operation (step S46), and advances the processing to step S47.

In step S45, when it is determined that there is no scrolling (step S45; NO), the processing skips step S46 and advances to step S47.

In step S47, the CPU 21 determines whether there is long pressing operation through the operating unit 22 in one date frame in the other display region of the calendar display region 340 (step S47).

In step S47, when it is determined that the long pressing operation is performed (step S47; YES), the CPU 21 displays the detailed screen showing the details of the information shown in the long pressed date frame. The CPU 21 also displays the detailed screen showing the details of the information shown in the date frame of the other display region corresponding to the long pressed date frame (step S48). Then, the processing advances to step S49.

In step S47, when it is determined that long pressing operation is not performed (step S47; NO), the processing skips step S48 and advances to step S49.

In step S49, the CPU 21 determines whether the now divided button 390 is touched (step S49).

In step S49, when it is determined that the now divided button 390 is not touched (step S49; NO), the processing advances to step S41.

In step S49, when it is determined that the now divided button 390 is touched (step S49; YES), the comparison display control processing ends.

As described above, according to the present embodiment, the server 10 displays on the terminal apparatus 20 the schedule (calendar information) in which the predetermined date information or time span information is corresponded to a plurality of schedule frames in a schedule template in which a plurality of schedule frames are provided in a predetermined format. The server 10 displays the divide button 320 to display the plurality of schedules aligned on the terminal apparatus 20. When a plurality of schedules are displayed aligned on the terminal apparatus 20 according to operation of the divide button 320, the server 10 displays part of the schedule.

Therefore, since part of the schedule is displayed instead of simply displaying a plurality of schedules (calendar information) aligned on the terminal apparatus 20, the information (data) displayed in each of the plurality of schedules can be seen at once. With this, regarding the data managed corresponded with the schedule, the plurality of pieces of data can be easily understood at the same time from different points of view.

When the plurality of schedules are displayed aligned according to operation on the divide button 320, the server 10 displays part of the schedule so that the schedule frames which are the target of comparison between the displayed plurality of schedules are all displayed. Therefore, the information (data) displayed in the plurality of schedules can be easily seen at the same time. With this, regarding the data managed corresponded with the schedule, the plurality of pieces of data can be easily understood at the same time from different points of view.

When the plurality of schedules are displayed aligned according to operation of the divide button 320, the server 10 displays part of the schedule so that the date information corresponded with the schedule frame in the region partially displayed becomes the same among the schedules. Therefore, it is possible to easily see the information displayed in the plurality of schedules. With this, regarding the data managed corresponded with the schedule, the plurality of pieces of data can be easily understood at the same time from different points of view.

The server 10 displays the schedules corresponded to the attribute information selected in the terminal apparatus 20 aligned. Therefore, the information regarding the attribute of the schedule displayed aligned can be easily compared to each other.

The server 10 displays the schedules corresponded to the schedule term information selected in the terminal apparatus 20 aligned. Therefore, the information of the schedule can be easily compared and analyzed by displaying the past schedules aligned. Moreover, by aligning and displaying the schedules of the past and the future, it is easy to make future plans.

The server 10 displays the plurality of schedules in a display format selected on the terminal apparatus 20. Therefore, the plurality of schedules can be displayed aligned in a display format desired by the user. With this, it is possible to easily analyze the information of the schedule and to make future plans.

Specifically, when the first display format (vertical dividing format) is selected with the terminal apparatus 20, the server 10 displays the plurality of schedules limiting to the schedule frame of the predetermined day of week. When the second display format (horizontal dividing format) is selected, the server 10 displays the plurality of schedules limiting to the schedule frame of the predetermined week. Therefore, according to the divided format, the information of the schedule can be displayed focusing on a certain day of the week or a certain week. With this, it is possible to easily analyze the information of the schedule and to make future plans.

The server 10 displays the schedule information (calendar information) in each of the first display region and the second display region of the terminal apparatus 20. When the predetermined operation is performed on either one of the schedule information displayed in the first display region or the schedule information displayed in the second display region, the terminal apparatus 20 changes the display mode of the operated schedule information to the display mode according to the predetermined operation, and changes the display mode of the other schedule information according to the predetermined operation.

Therefore, when predetermined operation is performed on either one of the schedule information displayed in the first display region and the schedule information displayed in the second display region, the display mode of the schedule information (calendar information) displayed in the first display region and the second display region can be synchronized and changed to a display mode according to the predetermined operation. With this, regarding the data managed corresponded with the schedule information, the plurality of pieces of data can be easily understood at the same time from different points of view.

When the long pressing is performed on one schedule frame (date frame) of either one schedule information among the schedule information displayed in the first display region and the schedule information displayed in the second display region, the terminal apparatus 20 displays the detailed information corresponding to the schedule frame, and displays the detailed information regarding the schedule frame corresponding to the long pressed schedule frame in the other schedule information. With this, regarding the data managed corresponded with the schedule information, the plurality of pieces of data can be easily understood at the same time from different points of view.

When the scrolling operation is performed on either one of the schedule information displayed in the first display region or the schedule information displayed in the second display region, the terminal apparatus 20 slides the schedule information displayed in one display region according to the scrolling operation, and slides the other schedule information according to the scrolling operation. Therefore, since the corresponding schedule frames between the schedule information can move and slide together, the schedule information displayed in the first display region and the schedule information displayed in the second display region can be easily compared.

According to the above description, the example using the HDD, SSD of the storage 15 as the computer-readable medium storing the program regarding the present invention is described, but the present invention is not limited to the above example. A flash memory or a portable storage medium such as a CD-ROM can be used as other computer-readable mediums. A carrier wave is applied to the present invention as the medium providing data of the program regarding the present invention through the communication lines.

The description regarding the preferred embodiments are merely examples of the display control apparatus regarding the present invention and the details are not limited to the above.

For example, according to the present embodiment, the calendar display region 340 is divided in half vertically or horizontally, and the calendar information is displayed in each display region, but the present embodiment is not limited to the above. Any display format in which the calendar information can be easily compared is possible. The calendar display region 340 can be divided into three or more regions vertically or horizontally and the calendar information can be displayed in each display region. The calendar display region 340 can be divided into two or more regions vertically and horizontally, and the calendar information can be displayed in the plurality of display regions (four or more) in a grid shape.

According to the present embodiment, when the calendar information is displayed in each display region divided in the calendar display region 340 and the dividing method and the attribute and display period of the calendar information are selected each time, but the present invention is not limited to the above. For example, the data of the dividing method and the attribute and display period of the calendar information recently selected and input can be stored in the account data table 40 corresponded with the user ID (worker number). Then, the next time that the calendar information is to be displayed, in the divided display region of the calendar display region 340, the server 10 reads out from the account data table 40 the data regarding the dividing method, and the attribute and the display period stored corresponded with the user ID according to the user touching the divide button 320. Based on such data, the calendar information can be displayed in the predetermined display region of the calendar display region 340.

According to the present embodiment, the example of applying the store data management system 1 in a restaurant is described but the present invention is not limited to the above, and the store data management system 1 can be applied to other businesses. According to input using the stamp of the store data management system 1, since the limitations such as time and space can be reduced by fast input and input on a portable terminal, the system can be employed in various businesses by preparing stamps matching the business.

According to the present embodiment, the calendar information is a schedule in a monthly calendar format in which predetermined date information is corresponded with the plurality of schedule frames of the schedule template (see FIG. 20A) in which one week is to be one horizontal line and the plurality of schedule frames are aligned in a grid. The present invention is not limited to the above. For example, the calendar information may be a schedule in a weekly calendar format in which the predetermined date information and the time span information are corresponded to a plurality of schedule frames of the schedule template (see FIG. 20B) in which one week is to be one horizontal line and the time span is to be the vertical line and the plurality of schedule frames are aligned in a grid.

Figures 21A, 21B:
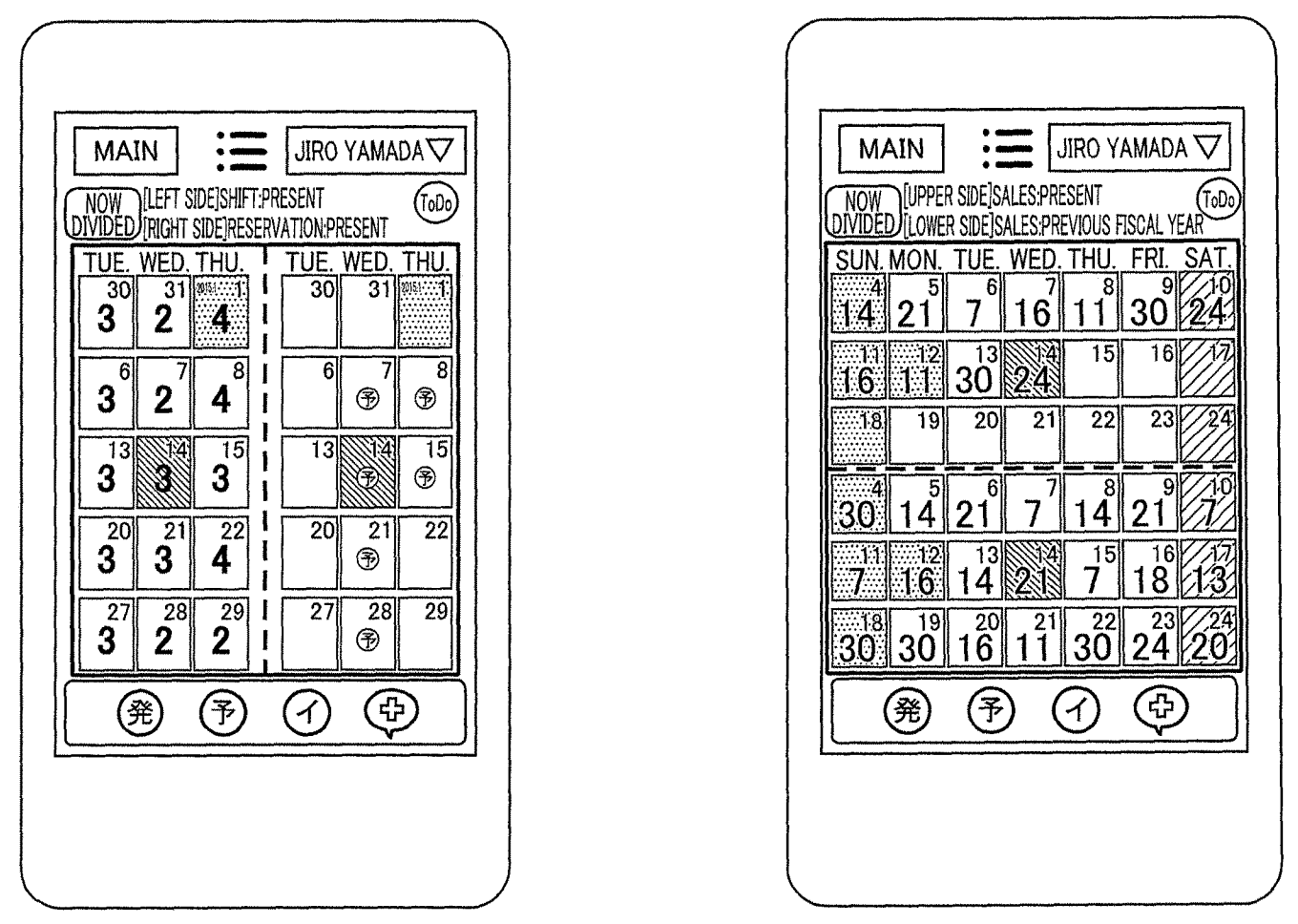

According to the present embodiment, as shown in FIG. 14B, in the display screen 300D, in the left display region of the calendar display region 340, the calendar information with the attribute set to shift and the display period set to present is displayed, and in the right display region the calendar information with the attribute set to reservation and the display period set to present is displayed, but the attribute and period of the calendar information displayed in each display region can be displayed to be understood at one look. For example, as shown in FIG. 21A, on the right of the now divided button displays that the attribute is set to shift and the period is set to present in the calendar information of the left display region and that the attribute is set to reservation and the period is set to present in the calendar information of the right display region.

Similarly, according to the present embodiment, as shown in FIG. 17B, in the display screen 300F, in the upper display region of the calendar display region 340, the calendar information with the attribute set to sales and the display period set to present is displayed, and in the lower display region, the calendar information with the attribute set to sales and the display period set to previous fiscal year is displayed. In this case, for example, as shown in FIG. 21B, on the right of the now divided button displays that the attribute is set to sales and the period is set to present in the calendar information of the upper display region and that the attribute is set to sales and the period is set to previous fiscal year in the calendar information of the lower display region.

According to the above-described embodiments, in the comparison display control processing, when it is determined that the scrolling operation is performed in any of the display regions, then it is determined whether the long pressing is performed, but the present invention is not limited to the above. For example, it can be determined whether the pinch out or pinch in operation is performed in any of the display regions. When it is determined that the pinch out operation is performed in any of the display regions, the CPU 21 of the terminal apparatus 20 performs enlarging of the display at the same magnification in both display regions. When it is determined that the pinch in operation is performed in any of the display regions, the CPU 21 of the terminal apparatus 20 performs reducing of the display at the same magnification in both display regions.

According to the present embodiment, the attribute and period selecting processing are performed by the CPU 11 of the server apparatus 10. The present invention is not limited to the above, and alternatively, the CPU 21 of the terminal apparatus 20 can perform the attribute and the period selecting processing.

The detailed configuration and the operation of the components in the store data management system 1 according to the present embodiment can be suitably changed without leaving the scope of the present invention.

The embodiment of the present invention are described above, but the scope of the present invention is not limited to the above-described embodiment. The scope of the present invention is limited to the invention as claimed and its equivalents.

What is claimed is:

1. A schedule management apparatus comprising:
a memory which stores a schedule in which different date information is associated with each of a plurality of schedule frames in a schedule template in which the plurality of schedule frames are arranged in a grid; and
a processor configured to perform processes comprising:
reading the schedule from the memory and generating a first display screen to be displayed on a display based on the schedule, the first display screen including (i) a schedule display region in which the schedule is displayed in the schedule template, and (ii) a button operable by a user to instruct display of a plurality of partial schedules; and
in response to operation of the button by the user, generating a second display screen to be displayed on the display, wherein the second display screen includes a plurality of sub-display regions in place of the schedule display region, each of the sub-display regions displays one of the plurality of partial schedules, each of the plurality of partial schedules corresponds to a part of the schedule, and each of the plurality of partial schedules is displayed to include at least one schedule frame that is surrounded by a plurality of other schedule frames,
wherein the processor generates the second display screen such that an area of the display occupied by the plurality of partial schedules is the same size as an area of the display occupied by the schedule in the first display screen.

2. The schedule management apparatus according to claim 1, wherein the second display screen is generated to display the plurality of partial schedules in the sub-display regions such that respective schedule frames in the partial schedules that are targets of comparison between the partial schedules are displayed.

3. The schedule management apparatus according to claim 1, wherein the second display screen is generated to display the plurality of partial schedules in the sub-display regions such that date information associated with the schedule frames in a first one of the partial schedules is the same as date information associated with the schedule frames in a second one of the partial schedules.

4. The schedule management apparatus according to claim 1, wherein the second display screen is generated to display the plurality of partial schedules in the sub-display regions such that alignment of date information in a vertical direction and a horizontal direction in a first one of the partial schedules is the same as alignment of date information in the vertical direction and the horizontal direction in a second one of the partial schedules.

5. A schedule management apparatus, comprising:
a memory which stores a schedule in which different date and time span information are associated with each of a plurality of schedule frames in a schedule template in which the plurality of schedule frames are arranged in a grid; and
a processor configured to perform processes comprising:
reading the schedule from the memory and generating a first display screen to be displayed on a display based on the schedule, the first display screen including (i) a schedule display region in which the schedule is displayed in the schedule template, and (ii) a button operable by a user to instruct display of a plurality of partial schedules; and
in response to operation of the button by the user, generating a second display screen to be displayed on the display, wherein the second display screen includes a plurality of sub-display regions in place of the schedule display region, each of the sub-display regions displays one of the plurality of partial schedules, each of the plurality of partial schedules corresponds to a part of the schedule, and each of the plurality of partial schedules is displayed to include at least one schedule frame that is surrounded by a plurality of other schedule frames, wherein the processor generates the second display screen such that an area of the display occupied by the plurality of partial schedules is the same size as an area of the display occupied by the schedule in the first display screen.

6. The schedule management apparatus according to claim 5, wherein the second display screen is generated to display the plurality of partial schedules in the sub-display regions such that time span information associated with the schedule frames in a first one of the partial schedules is the same as time span information associated with the schedule frames in a second one of the partial schedules.

7. The schedule management apparatus according to claim 5, wherein the second display screen is generated to display the plurality of partial schedules in the sub-display regions such that respective schedule frames in the partial schedules that are targets of comparison between the partial schedules are displayed.

8. The schedule management apparatus according to claim 5, wherein the second display screen is generated to display the plurality of partial schedules in the sub-display regions such that date information associated with the schedule frames in a first one of the partial schedules is the same as date information associated with the schedule frames in a second one of the partial schedules.

9. The schedule management apparatus according to claim 5, wherein the second display screen is generated to display the plurality of partial schedules in the sub-display regions such that alignment of date information in a vertical direction and a horizontal direction in a first one of the partial schedules is the same as alignment of date information in the vertical direction and the horizontal direction in a second one of the partial schedules.

10. A schedule management apparatus comprising:
a memory which stores a schedule in which different date and day of week information are associated with each of a plurality of schedule frames in a schedule template in which the plurality of schedule frames are arranged in a grid; and
a processor configured to perform processes comprising:
reading the schedule from the memory and generating a first display screen to be displayed on a display based on the schedule, the first display screen including (i) a schedule display region in which the schedule is displayed in the schedule template, and (ii) a button operable by a user to instruct display of a plurality of partial schedules; and in response to operation of the button by the user, generating a second display screen to be displayed on the display, wherein the second display screen includes a plurality of sub-display regions in place of the schedule display region, each of the sub-display regions displays one of the plurality of partial schedules, each of the plurality of partial schedules corresponds to a part of the schedule, and each of the plurality of partial schedules is displayed to include at least one schedule frame that is surrounded by a plurality of other schedule frames, wherein the processor generates the second display screen such that an area of the display occupied by the plurality of partial schedules is the same size as an area of the display occupied by the schedule in the first display screen.

11. The schedule management apparatus according to claim 10, wherein the second display screen is generated to display the plurality of partial schedules in the sub-display regions such that day of week information associated with the schedule frames in a first one of the partial schedules is the same as day of week information associated with the schedule frames in a second one of the partial schedules.

12. The schedule management apparatus according to claim 10, wherein the second display screen is generated to display the plurality of partial schedules in the sub-display regions such that respective schedule frames in the partial schedules that are targets of comparison between the partial schedules are displayed.

13. The schedule management apparatus according to claim 10, wherein the second display screen is generated to display the plurality of partial schedules in the sub-display regions such that date information associated with the schedule frames in a first one of the partial schedules is the same as date information associated with the schedule frames in a second one of the partial schedules.

14. The schedule management apparatus according to claim 10, wherein the second display screen is generated to display the plurality of partial schedules in the sub-display regions such that alignment of date information in a vertical direction and a horizontal direction in a first one of the partial schedules is the same as alignment of date information in the vertical direction and the horizontal direction in a second one of the partial schedules.

* * * * *